United States Patent
Nies et al.

(10) Patent No.: US 8,321,062 B2
(45) Date of Patent: Nov. 27, 2012

(54) SYSTEMS AND METHOD FOR OPERATING A WIND TURBINE HAVING ACTIVE FLOW CONTROL

(75) Inventors: Jacob Johannes Nies, Zwolle (NL); Wouter Haans, The Hague (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/613,274

(22) Filed: Nov. 5, 2009

(65) Prior Publication Data

US 2010/0076614 A1  Mar. 25, 2010

(51) Int. Cl.
 G05D 3/12 (2006.01)
 F03D 11/00 (2006.01)
 G01B 11/16 (2006.01)
 G01H 9/00 (2006.01)

(52) U.S. Cl. ............ 700/287; 290/44; 290/55; 700/286; 700/288

(58) Field of Classification Search ........................ None
See application file for complete search history.

(56) References Cited

U.S. PATENT DOCUMENTS

| | | | |
|---|---|---|---|
| 3,685,292 A | 8/1972 | Brown | |
| 4,692,095 A | 9/1987 | Lawson-Tancred | |
| 5,275,643 A | 1/1994 | Usui | |
| 5,938,404 A | 8/1999 | Domzalski et al. | |
| 6,629,674 B1 * | 10/2003 | Saddoughi et al. | 244/207 |
| 6,940,185 B2 | 9/2005 | Andersen et al. | |
| 6,972,498 B2 * | 12/2005 | Jamieson et al. | 290/55 |
| 7,354,247 B2 | 4/2008 | Bonnet | |
| 7,363,808 B2 * | 4/2008 | Ormel et al. | 73/170.01 |
| 7,387,491 B2 | 6/2008 | Saddoughi et al. | |
| 7,420,289 B2 * | 9/2008 | Wang et al. | 290/44 |
| 7,435,057 B2 | 10/2008 | Parera | |
| 7,582,977 B1 | 9/2009 | Dehlsen | |
| 7,637,715 B2 | 12/2009 | Battisti | |
| 7,802,961 B2 | 9/2010 | Grabau | |
| 2001/0038798 A1 | 11/2001 | Foster | |
| 2005/0042102 A1 | 2/2005 | Teichert | |
| 2005/0242233 A1 * | 11/2005 | Battisti | 244/58 |
| 2007/0231151 A1 * | 10/2007 | Herr et al. | 416/229 A |

(Continued)

FOREIGN PATENT DOCUMENTS

DE  102006032387 A1 *  1/2008

(Continued)

OTHER PUBLICATIONS

David F. Fisher & Michael C. Fischer, Development Flight Tests of Jetstar LFC Leading-Edge Flight Test Experiment, (NASA, Langley Research Center ed., 1987).

(Continued)

*Primary Examiner* — John R. Cottingham
*Assistant Examiner* — Sunray Chang
(74) *Attorney, Agent, or Firm* — James McGinness; Armstrong Teasdale LLP

(57) ABSTRACT

A method of operating a wind turbine that includes a flow control system includes operating the wind turbine in a first mode, operating the wind turbine in a second mode that is different than the first mode, acquiring operational data of the wind turbine during at least the second mode, determining an effectiveness of the flow control system using the acquired operational data, and performing an action based on the effectiveness of the flow control system.

19 Claims, 11 Drawing Sheets

U.S. PATENT DOCUMENTS

| | | | |
|---|---|---|---|
| 2008/0181775 | A1 | 7/2008 | Livingston et al. |
| 2009/0139739 | A1 | 6/2009 | Hansen |
| 2009/0140862 | A1 | 6/2009 | Eggleston |
| 2009/0304505 | A1 | 12/2009 | Wobben |
| 2009/0311097 | A1 | 12/2009 | Pierce et al. |
| 2010/0076614 | A1 | 3/2010 | Nies et al. |
| 2010/0135790 | A1* | 6/2010 | Pal et al. .......................... 416/1 |
| 2010/0135794 | A1 | 6/2010 | Nies et al. |
| 2010/0135795 | A1 | 6/2010 | Nies et al. |

FOREIGN PATENT DOCUMENTS

| | | | |
|---|---|---|---|
| EP | 1517033 A1 | | 3/2005 |
| GB | 2186033 A | | 8/1987 |
| GB | 2466433 | * | 12/2008 |
| WO | 2004092577 A1 | | 10/2004 |
| WO | 2006069575 A1 | | 7/2006 |
| WO | 2008080407 A1 | | 7/2008 |
| WO | 2009025548 A1 | | 2/2009 |

OTHER PUBLICATIONS

Gustave P. Corten & Herman F. Veldkamp, "Insects Can Halve Wind-Turbine Power," 412 Nature, 42-43 (2001).

Albert L. Braslow, "A History of Suction-Type Laminar-Flow Control with Emphasis on Flight Research," Monographs in Aerospace History, No. 13, pp. 20, 21, 24 (1999).

Hal Romanowitz, "Alternate Energy Systems Engineering," available at www.oakcreekenergy.com/reports/flash/GCI-20020401.html (last visited Mar. 2, 2009).

Office Action dated Oct. 5, 2010, U.S. Appl. No. 12/613,170, 21 pages.

Office Action dated Aug. 19, 2010, U.S. Appl. No. 12/613,274, 17 pages.

www.co/9.com/portal/basf/en/dt.jsp?setCursor=1_314889; EC European Coatings Show 2009"Col. 9® Anti-Aging for Facades"; Nuremberg, Germany, Mar. 31-Apr. 2, 2009; Copyright 2006 BASF Aktiengesellschaft; 1 page.

www2.dupont.com/Teflon_Industrial/en_US/products/product_. . . ; "Industrial Coatings"; Copyright 2009 DuPont, p. 1.

www.basf.com/group/corporate/en/news-and-media-relations/sc . . . ; "Science around us: Emulating nature self-cleaning effects for textiles . . . "; Copyright 2009; p. 2.

www.sabic-ip.com/gep/Plastics/en/ProductsAndServices/ProductLine/lexan.html; "SABIC Innovative Plastics™"; Copyright 2007 SABIC Innovative Plastics Holding BV; pp. 1-3.

* cited by examiner

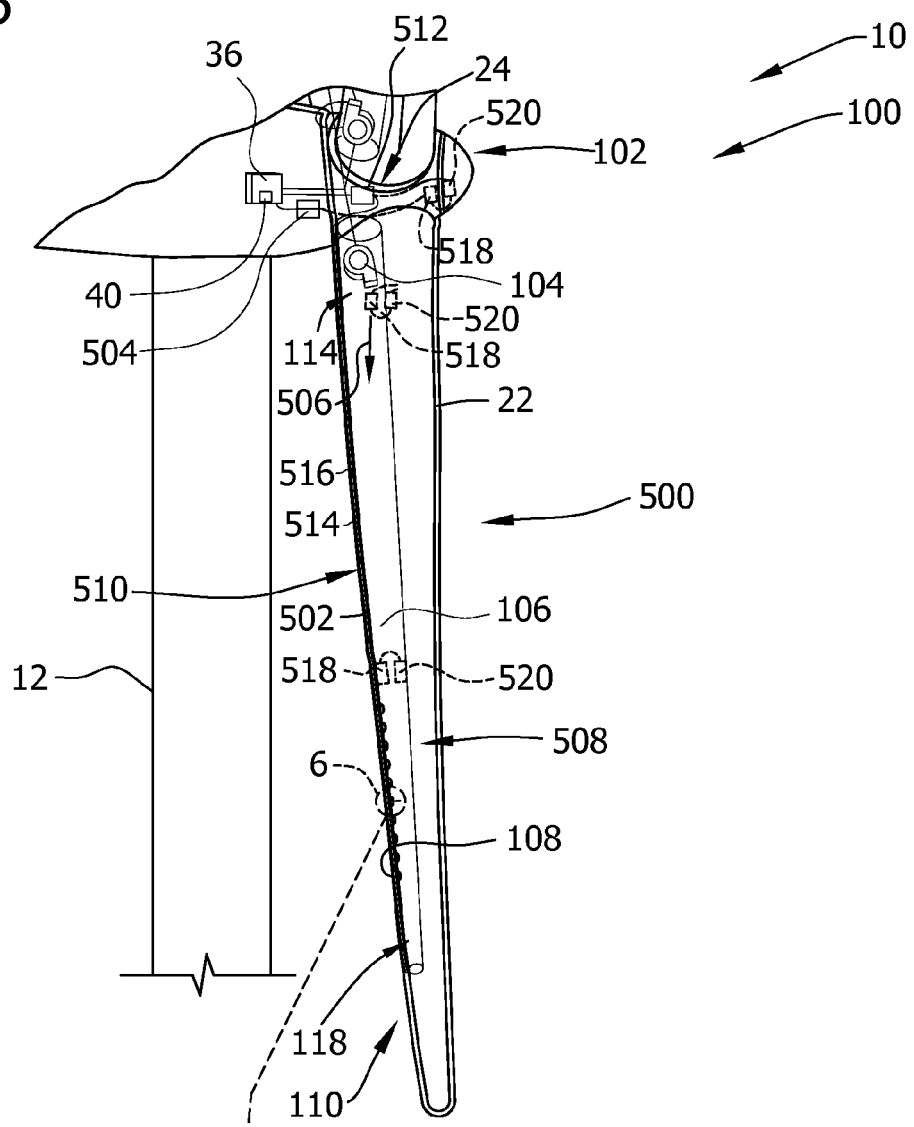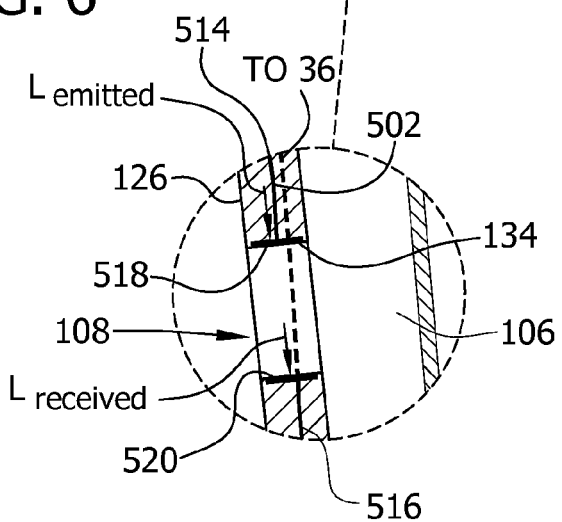

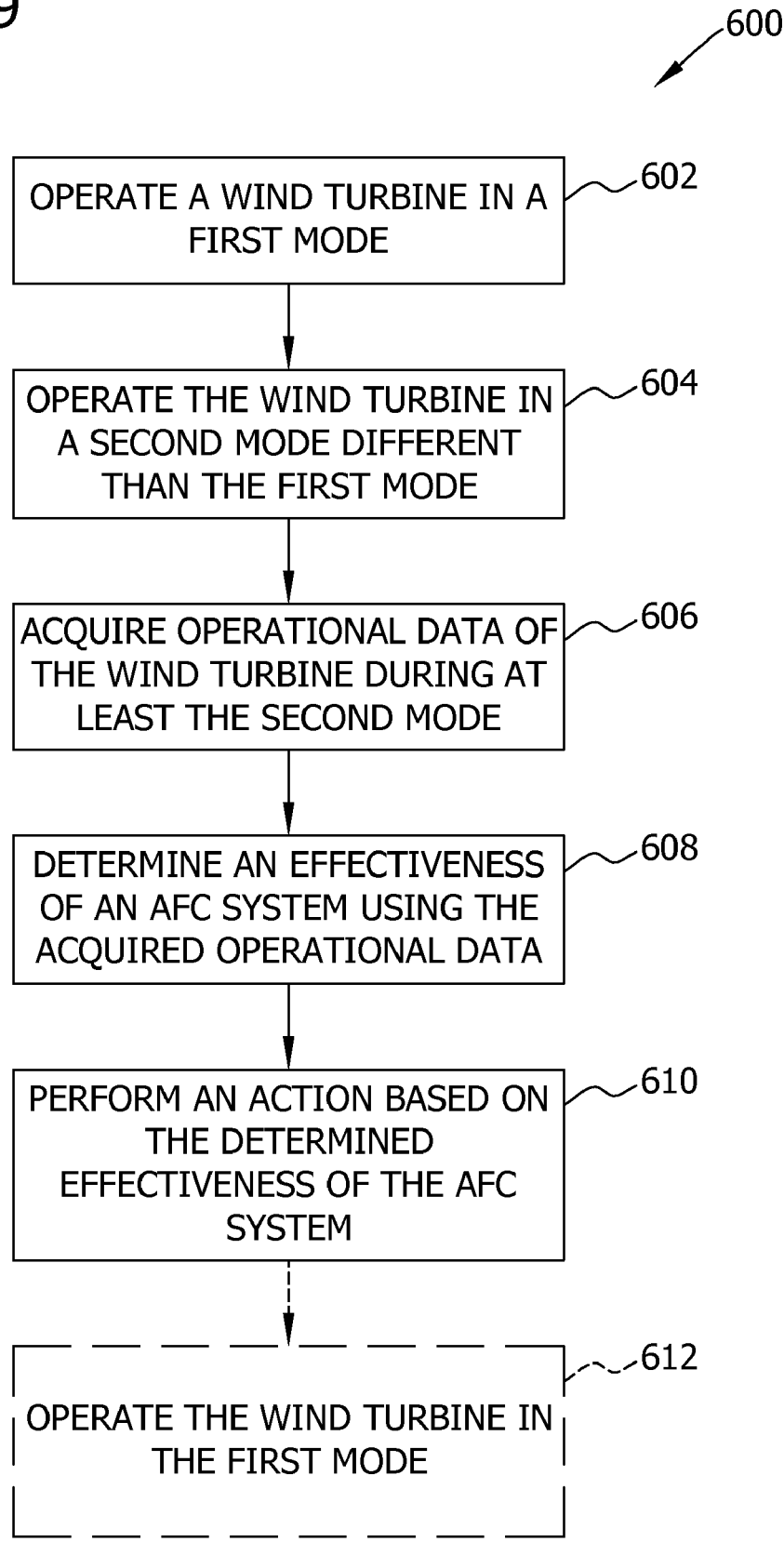

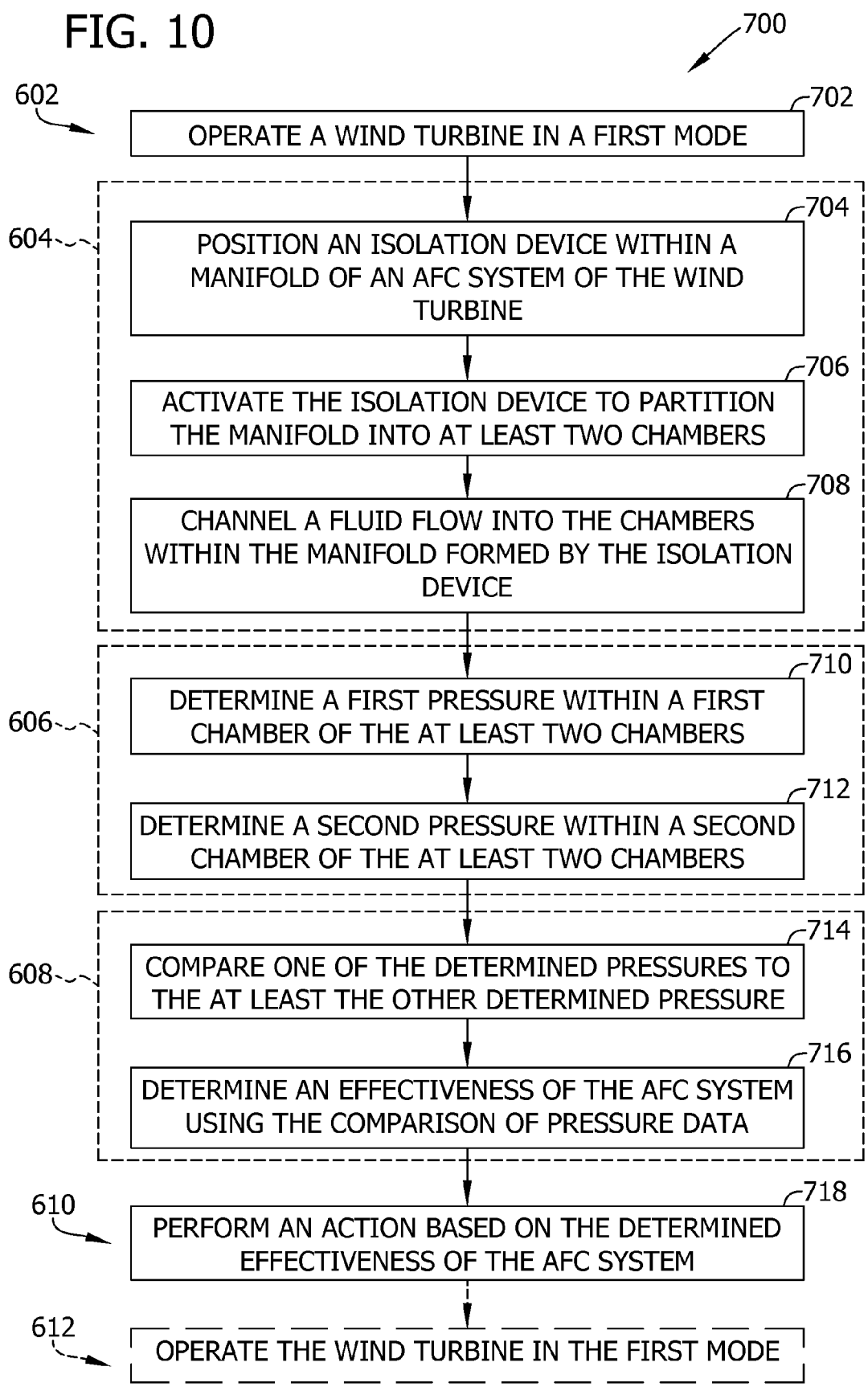

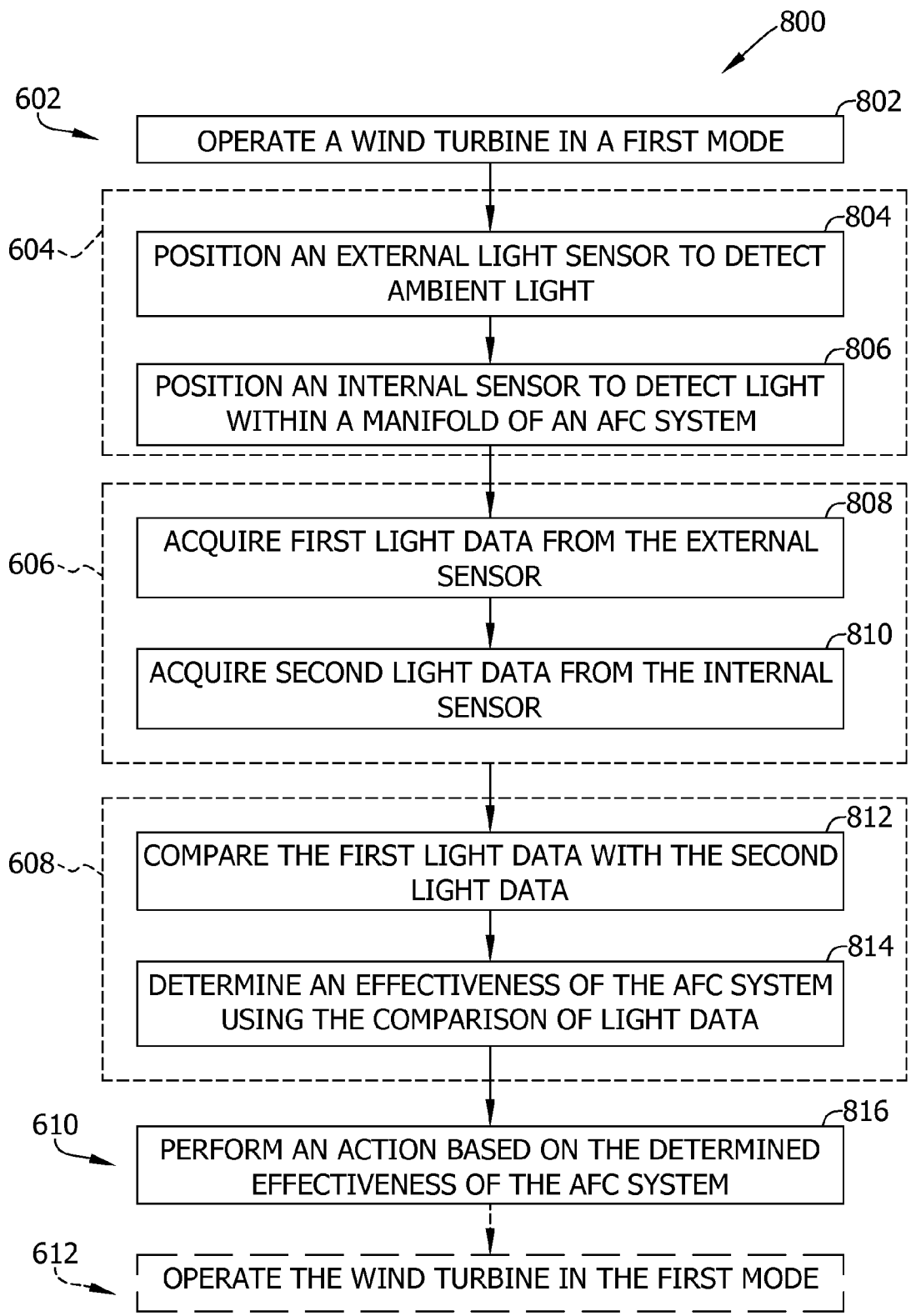

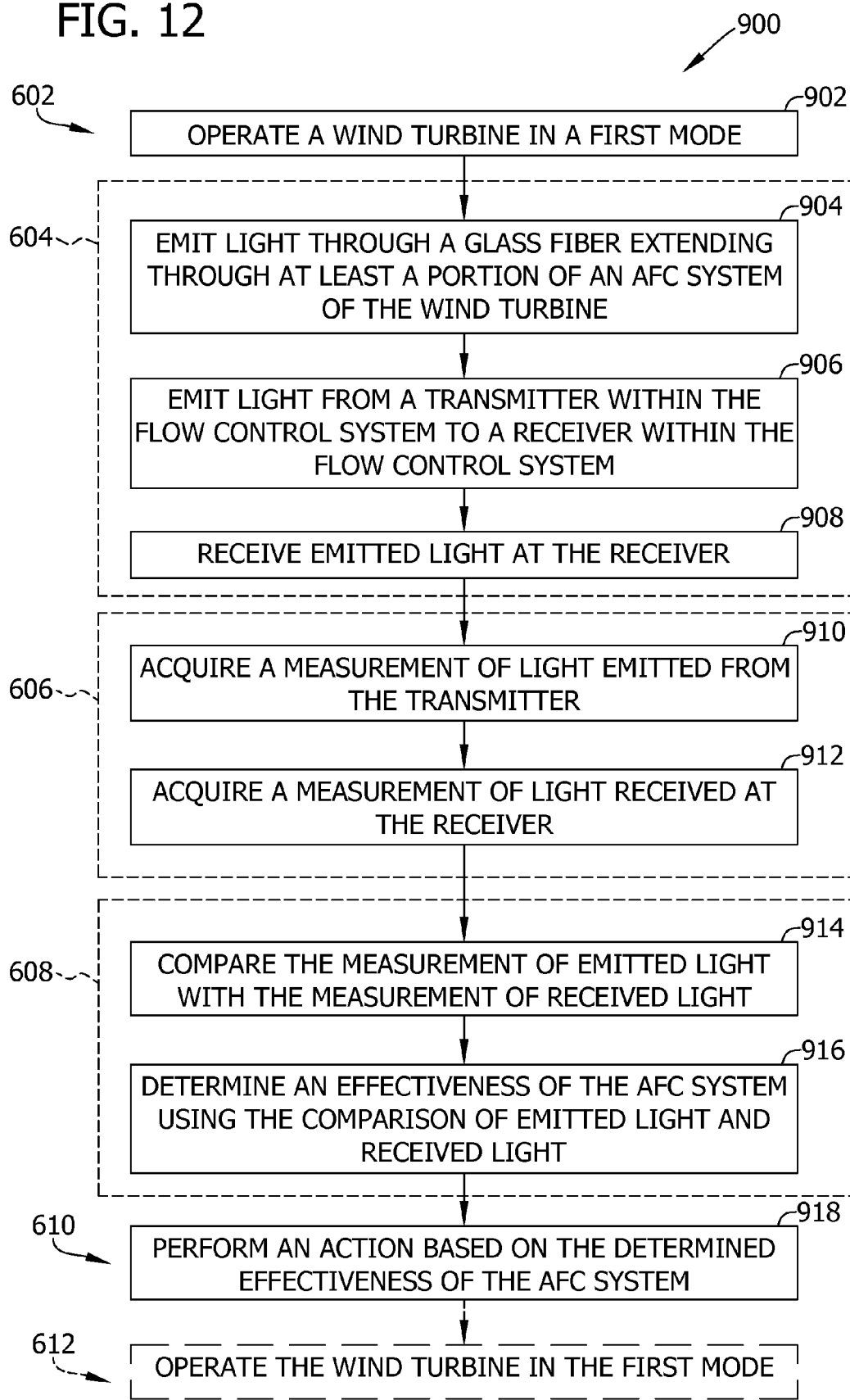

SYSTEMS AND METHOD FOR OPERATING A WIND TURBINE HAVING ACTIVE FLOW CONTROL

CROSS REFERENCE TO RELATED APPLICATIONS

Cross-reference is hereby made to related, commonly assigned, co-pending applications: U.S. Ser. No. 12/613,079 entitled "Method for Operating a Wind Turbine with Reduced Blade Fouling," U.S. Ser. No. 12/613,157 entitled "Active Flow Control System for Wind Turbine," U.S. Ser. No. 12/613,287 entitled "Systems and Methods for Assembling an Air Distribution System for Use in a Rotor Blade of a Wind Turbine," U.S. Ser. No. 12/613,013 entitled "Systems and Method for Operating a Wind Turbine Having Active Flow Control," U.S. Ser. No. 12/613,268 entitled "Apparatus and Method for Cleaning an Active Flow Control (AFC) System of a Wind Turbine," U.S. Ser. No. 12/613,170 entitled "Systems and Method for Operating an Active Flow Control System." Each cross-referenced application is invented by Jacob Johannes Nies and Wouter Haans and is filed on the same day as this application. Each cross-referenced application is hereby incorporated by reference in its entirety.

BACKGROUND OF THE INVENTION

The embodiments described herein relate generally to methods and systems for operating a wind turbine having an active flow control system and, more particularly, to methods and systems for removing debris from the active flow control system and/or preventing an accumulation of debris within the active flow control system.

Active Flow Control (AFC) is a general term for technologies and/or systems that actively attempt to influence an aerodynamic response of an object in reaction to given in-flow conditions. More specifically, at least some known AFC systems are used to manipulate flow conditions across an airfoil. As used herein, the term "airfoil" refers to a turbine blade, a wing, and/or any other suitable airfoil. Although the embodiments described herein refer to a turbine blade, it should be understood that the embodiments described herein may be used with any suitable airfoil. In contrast to known passive flow control systems that provide substantially constant flow control, known AFC systems enable flow control to be selectively applied to an airfoil. At least some known AFC systems use air distribution systems to manipulate a boundary layer of air flowing across a surface of an airfoil. Known AFC systems include actuators that can be divided in two categories, depending on their net-mass-flow. The first category is zero-net-mass-flow actuators, such as synthetic jet actuators, and the second category is nonzero-net-mass-flow actuators, such as air ejection actuators, which may be steady or unsteady and/or blowing and/or suction actuators.

Because AFC systems are subjected to fluid flows that can contain debris, fouling of AFC perforations and/or apertures by debris is one of the obstacles for wide scale application of AFC on wind turbine blades, aircraft wings, and other airfoils. As used herein, the term "debris" refers to dirt, dust, insects, insect remains, particles, particulates, substances, suspended liquids and/or solids, and/or any other material that may contact and accumulate in and/or on the wind turbine blades and/or other airfoils. Further, the terms "perforation" and "aperture" can be used interchangeably throughout this application.

In general, fouling of the AFC apertures by debris has an adverse effect on AFC system performance. Further, components, other than the perforations, of at least some known AFC systems are susceptible to fouling as well. For example, in at least some known nonzero-net-mass-flow systems, ambient air, possibly polluted with debris, is drawn into the AFC system to feed the actuators. Such polluted intake air may foul the air distribution system, the actuators, and/or the perforations of the AFC system.

Such fouling of the perforations and/or other components of known AFC systems may alter fluid flows across an airfoil such that the fluid flows deviate from clean-state fluid flows for which the blade is designed to yield. Additionally, fouling on blade surfaces and/or within AFC systems may reduce a power output of a system using airfoils and/or an AFC system, such as a wind turbine. However, manually cleaning each aperture of an AFC system is not practical because of a number of apertures in at least some known AFC systems and/or a duration of time that is required for the wind turbine to be offline for such manual cleaning.

Accordingly, it is desirable to provide a method and/or system for maintaining a wind turbine by cleaning an AFC system and/or preventing fouling of an AFC system. Further, such a method and/or system preferably minimizes or eliminates the need to manually clean the AFC system and/or blade. Moreover, it is desirable for such method and/or system to automatically perform an action based on operational data acquired from the wind turbine and, more particularly, on an operational characteristic of the AFC system.

BRIEF DESCRIPTION OF THE INVENTION

In one aspect, a method of operating a wind turbine that includes a flow control system is provided. The method includes operating the wind turbine in a first mode, operating the wind turbine in a second mode that is different than the first mode, acquiring operational data of the wind turbine during at least the second mode, determining an effectiveness of the flow control system using the acquired operational data, and performing an action based on the effectiveness of the flow control system.

In another aspect, a flow control system for use with a wind turbine is provided. The flow control system includes an air distribution system at least partially defined within at least one blade of the wind turbine. The air distribution system includes at least one aperture defined through an outer surface of the blade. The flow control system further includes a control system in operational control communication with the air distribution system. The control system is configured to operate the wind turbine in a first mode, operate the wind turbine in a second mode that is different than the first mode, acquire operational data of the wind turbine during at least the second mode, determine an effectiveness of the flow control system using the acquired operational data, and perform an action based on the effectiveness of the flow control system.

In yet another aspect, a wind turbine is provided. The wind turbine includes at least one blade and a flow control system having an air distribution system at least partially defined within the blade. The air distribution system includes at least one aperture defined through an outer surface of the blade. The wind turbine further includes a control system in operational control communication with the flow control system. The control system is configured to operate the wind turbine in a first mode, operate the wind turbine in a second mode that is different than the first mode, acquire operational data of the wind turbine during at least the second mode, determine an effectiveness of the flow control system using the acquired operational data, and perform an action based on the effectiveness of the flow control system.

The systems and methods described herein are configured to automatically perform an action based on acquired data relating to an AFC system. The embodiments described herein can selectively monitor operations of a wind turbine and/or alter an operation of wind turbine to acquire data relevant to determining an effectiveness of the AFC system.

BRIEF DESCRIPTION OF THE DRAWINGS

FIGS. 1-12 show exemplary embodiments of the systems and methods described herein.

FIG. 1 is a perspective view of an exemplary wind turbine.

FIG. 2 is a schematic view of an exemplary flow control system that may be used with the wind turbine shown in FIG. 1.

FIG. 3 is a schematic view of an exemplary detection system that may be used with the flow control system shown in FIG. 2.

FIG. 4 is a schematic view of an alternative exemplary detection system that may be used with the flow control system shown in FIG. 2.

FIG. 5 is a schematic view of a second alternative exemplary detection system that may be used with the flow control system shown in FIG. 2.

FIG. 6 is an enlarged cross-sectional view of a portion of the detection system shown in FIG. 5.

FIG. 7 is a schematic view of an exemplary alternative flow control system that may be used with the wind turbine shown in FIG. 1.

FIG. 8 is an enlarged cross-sectional view of a portion of the flow control system shown in FIG. 7.

FIG. 9 is a flowchart of an exemplary method of operating a wind turbine that may be used with the flow control systems shown in FIGS. 2 and 7.

FIG. 10 is a flowchart of an exemplary method of operating a wind turbine that may be used with a flow control system having the detection system shown in FIG. 3.

FIG. 11 is a flowchart of an exemplary method of operating a wind turbine that may be used with a flow control system having the detection system shown in FIG. 4.

FIG. 12 is a flowchart of an exemplary method of operating a wind turbine that may be used with a flow control system having the detection system shown in FIGS. 5 and 6.

DETAILED DESCRIPTION OF THE INVENTION

The embodiments described herein provide a monitoring and control system for active flow control (AFC) system fouling. A control system described herein detects a state of fouling, detects opportunities for correcting and/or preventing fouling, and applies an active cleaning strategy to correct and/or prevent fouling. The embodiments described herein include acquiring measurements of loads in turbine structures to enable monitoring of AFC effectiveness for each blade. More specifically, the embodiments described herein monitor a power curve to determine AFC system effectiveness; vary a level of AFC response over a period to measure performance of the AFC system; acquire measurements of loads in each blade to enable monitoring of AFC effectiveness for each blade; in parallel to determining the effectiveness of the AFC system, acquire measurements of AFC system internal quantities; acquire measurements of an amount of light that is allowed through apertures of the AFC system; and/or perform and/or switch to any suitable cleaning mode or combination of cleaning modes. As such, the embodiments described herein facilitate monitoring the AFC system for fouling and/or performance. For example, by comparing how individual blades perform over one rotation, such as one rotation in a changing wind field, a state of fouling of at least one blade is determined. By automatically determining an effectiveness of the AFC system, the systems and methods described herein facilitate removing debris from the AFC system with minimal operator intervention. It should be understood that comparisons referred to herein can be through a direct or indirect relationship with the original sensed quantity. For example, a light intensity can be transmitted as a 0-20 milliamp (mA) signal, a voltage level, a power level, and/or an artificial translation to a dimensionless scale.

Figure 1:
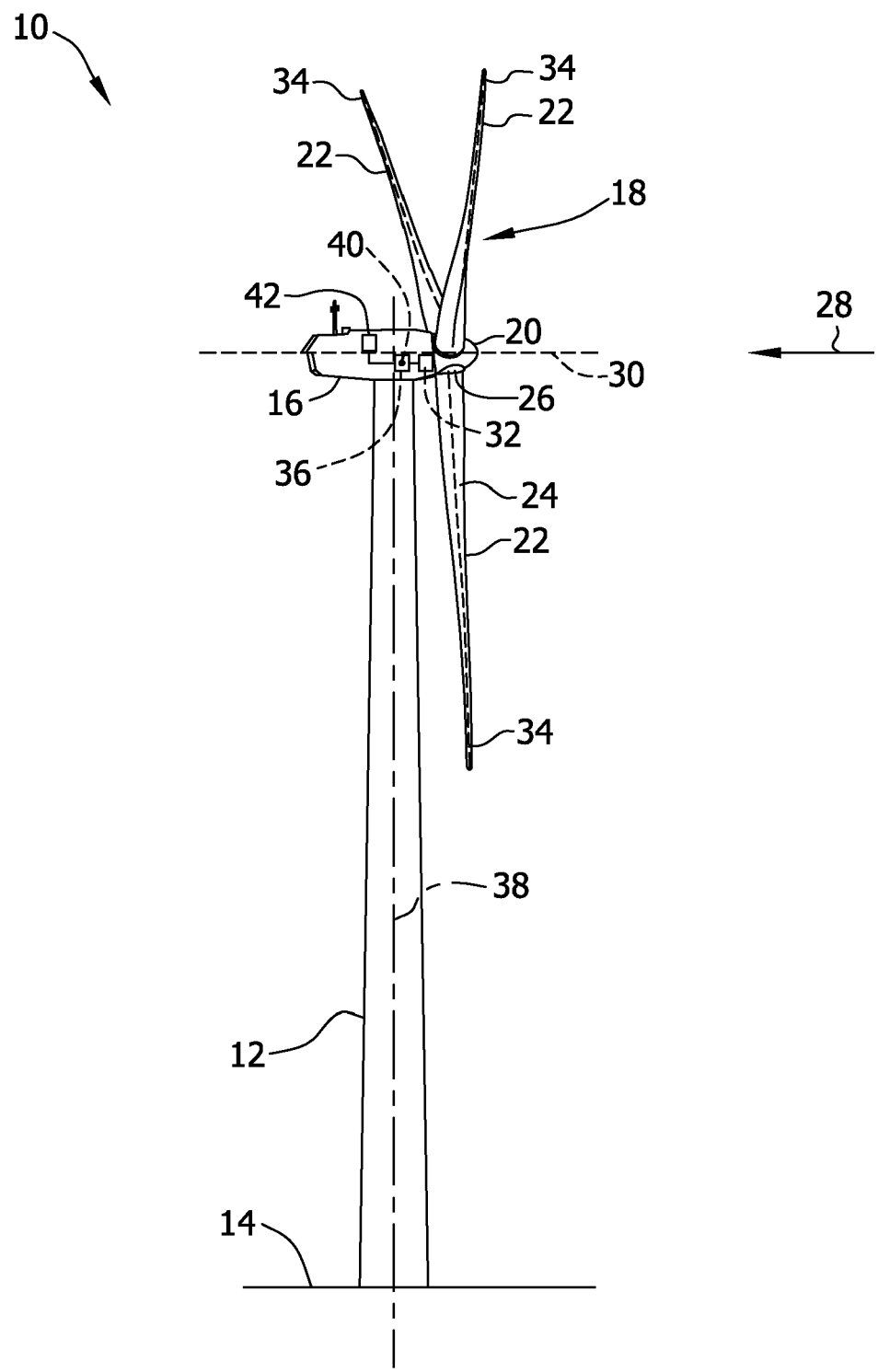

FIG. 1 is a perspective view of an exemplary wind turbine 10. In the exemplary embodiment, wind turbine 10 is a nearly horizontal-axis wind turbine. In another embodiment, wind turbine 10 may have any suitable tilt angle. Alternatively, wind turbine 10 may be a vertical axis wind turbine. In the exemplary embodiment, wind turbine 10 includes a tower 12 that extends from a supporting surface 14, a nacelle 16 mounted on tower 12, and a rotor 18 that is coupled to nacelle 16. Rotor 18 includes a rotatable hub 20 and at least one blade 22 coupled to and extending outward from hub 20. In the exemplary embodiment, rotor 18 has three blades 22. In an alternative embodiment, rotor 18 includes more or less than three blades 22. In the exemplary embodiment, tower 12 is fabricated from tubular steel such that a cavity (not shown in FIG. 1) is defined between supporting surface 14 and nacelle 16. In an alternative embodiment, tower 12 is any suitable type of tower. A height of tower 12 is selected based upon factors and conditions known in the art.

Blades 22 are spaced about hub 20 to facilitate rotating rotor 18 to enable kinetic energy to be transferred from the wind into usable mechanical energy, and subsequently, electrical energy. Blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to blades 22 are transferred to hub 20 via load transfer regions 26.

In the exemplary embodiment, blades 22 have a length of between approximately 30 meters (m) (99 feet (ft)) and approximately 120 (394 ft). Alternatively, blades 22 may have any length that enables wind turbine 10 to function as described herein. As wind strikes blades 22 from a direction 28, rotor 18 is rotated about an axis of rotation 30. As blades 22 are rotated and subjected to centrifugal forces, blades 22 are also subjected to various forces and moments. As such, blades 22 may deflect and/or rotate from a neutral, or non-deflected, position to a deflected position. Moreover, a pitch angle of blades 22, i.e., an angle that determines a perspective of blades 22 with respect to a rotor plane, may be changed by a pitch adjustment system 32 to control power, load, and/or noise generated by wind turbine 10 by adjusting an angular position a profile of at least one blade 22 relative to wind vectors. Pitch axes 34 for blades 22 are illustrated. In the exemplary embodiment, a pitch of each blade 22 is controlled individually by a control system 36. Alternatively, the blade pitch for all blades may be controlled simultaneously by control system 36. Further, in the exemplary embodiment, as direction 28 changes, a yaw direction of nacelle 16 may be controlled about a yaw axis 38 to position blades 22 with respect to direction 28.

In the exemplary embodiment, control system 36 is shown as being centralized with in nacelle 16, however control system 36 may be a distributed system throughout wind turbine 10, on supporting surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels may include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, flow control system control commands. The execution of sequences of instructions is not limited to any specific combination of hardware circuitry and software instructions.

In the exemplary embodiment, wind turbine 10 includes at least one environmental sensor 42. Environmental sensor 42 includes at least one of a wind direction sensor, a wind speed sensor, a temperature sensor, a rain/snow/hail/precipitation sensor, a humidity sensor, an ice sensor, and/or any other suitable sensor configured to detect and/or measure ambient and/or environment conditions. Sensor 42 is coupled in communication with control system 36 for transmitting data to control system 36.

Figure 2:
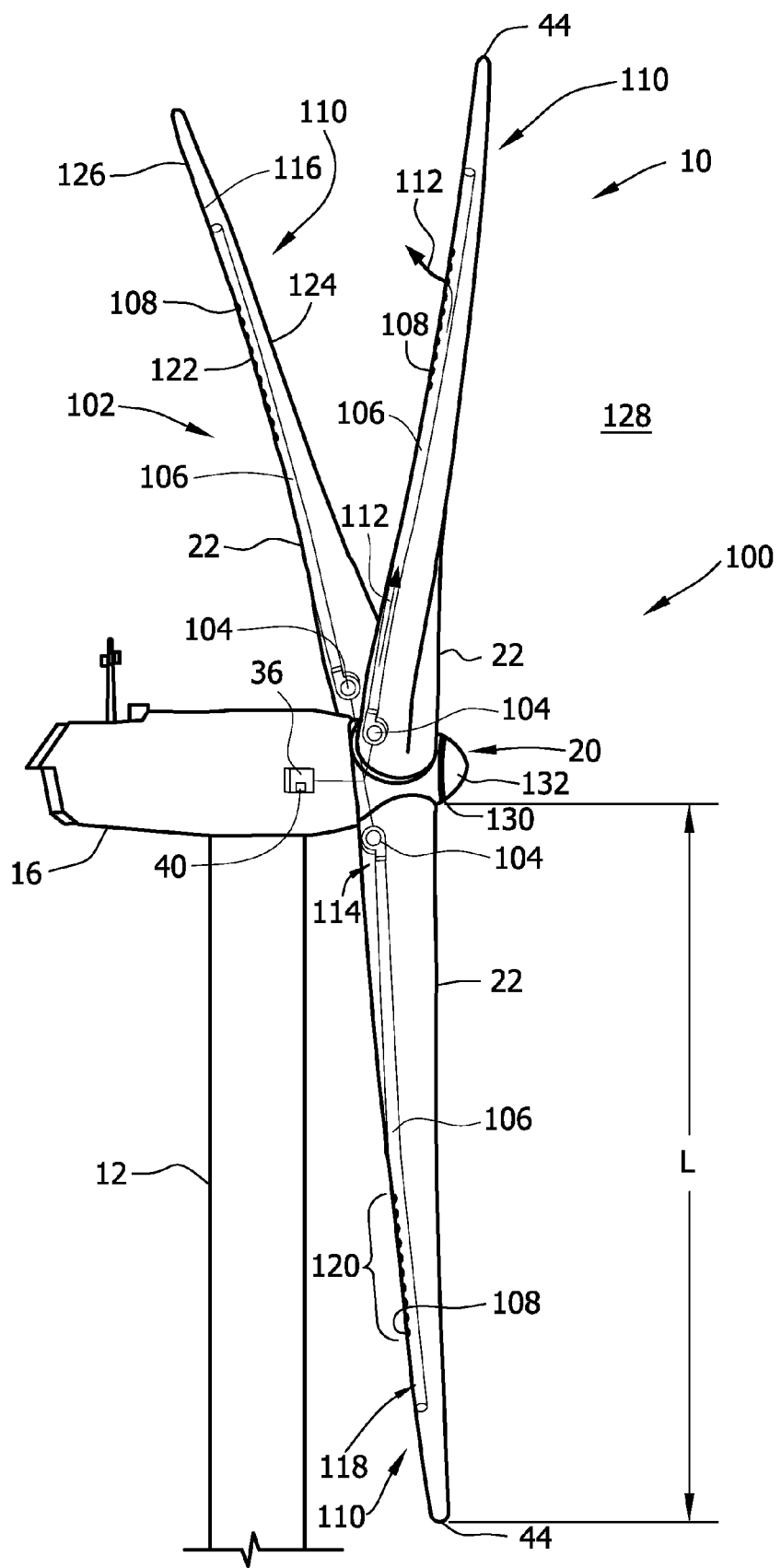
Figure 3:
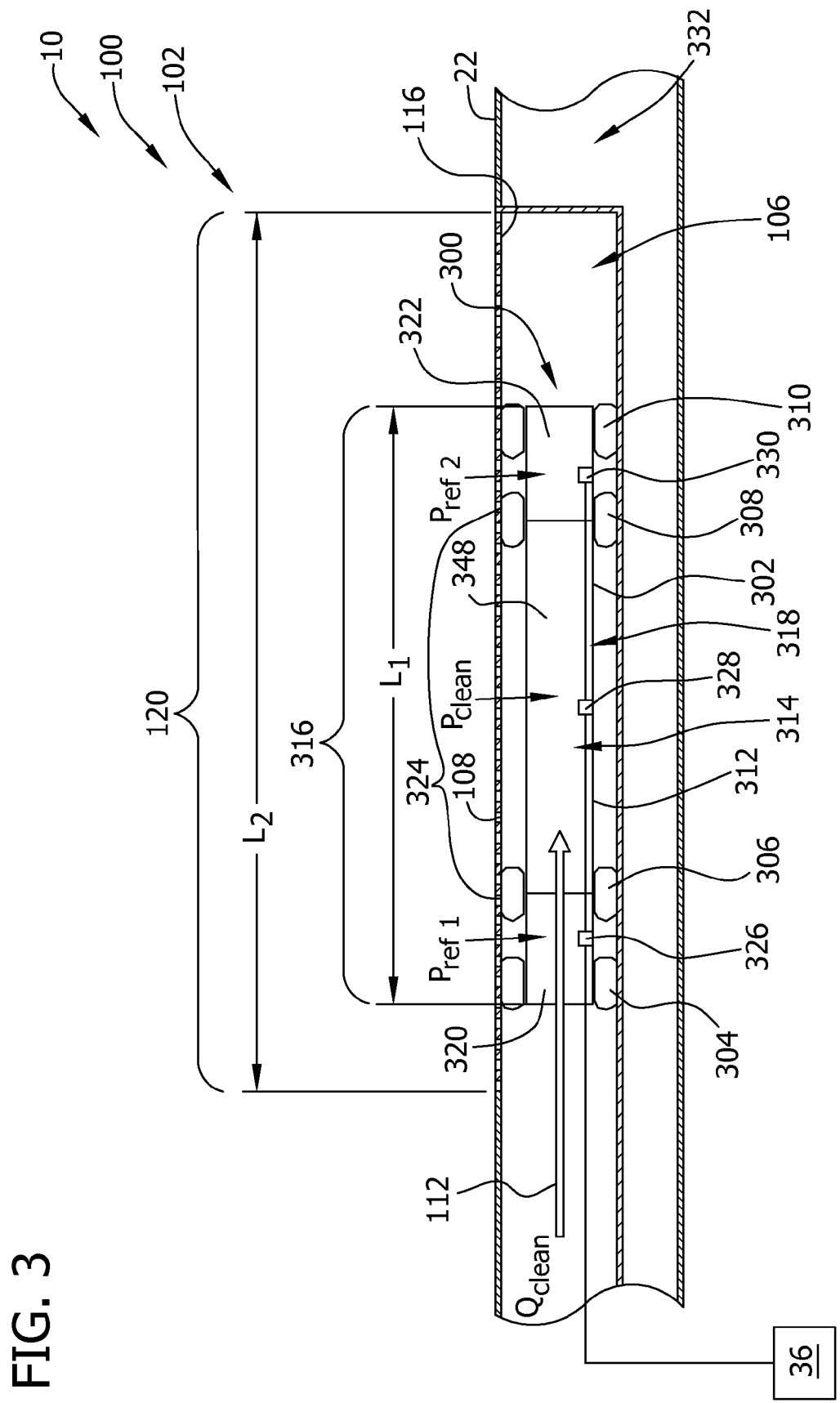
Figure 4:
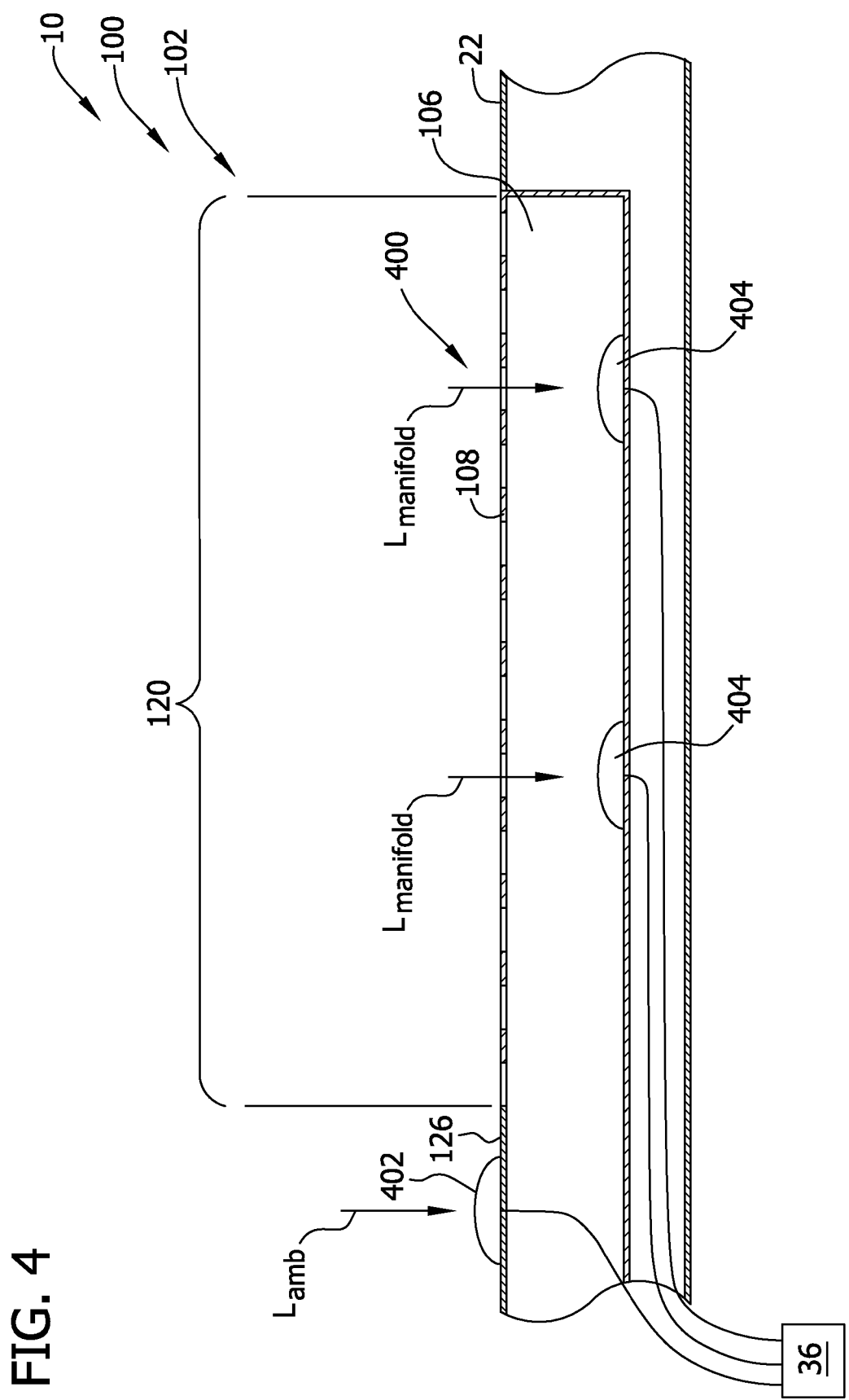

FIG. 2 is a schematic view of an exemplary flow control system 100 that may be used with wind turbine 10. FIG. 3 is a schematic view of an exemplary detection system 300 that may be used with flow control system 100. FIG. 4 is a schematic view of an alternative exemplary detection system 400 that may be used with flow control system 100. FIG. 5 is a schematic view of a second alternative exemplary detection system 500 that may be used with flow control system 100. FIG. 6 is an enlarged cross-sectional view of a portion of detection system 500. Components shown in FIG. 1 are labeled with similar reference number in FIGS. 2-6. Additional or alternative components are indicated by dashed lines.

In the exemplary embodiment, flow control system 100 is a nonzero-net-mass flow control system that includes an air distribution system 102. Control system 36 considered to be a component of flow control system 100 and is in operational control communication with air distribution system 102. As used herein, "operational control communication" refers to a link, such as a conductor, a wire, and/or a data link, between two or more components of wind turbine 10 that enables signals, electric currents, and/or commands to be communicated between the two or more components. The link is configured to enable one component to control an operation of another component of wind turbine 10 using the communicated signals, electric currents, and/or commands.

Air distribution system 102 includes at least one flow control device 104, at least one manifold 106, and at least one aperture 108. At least one flow control device 104, a respective manifold 106, and one or more corresponding apertures 108 form an assembly 110. Each blade 22 includes an assembly 110 at least partially defined therein. As such, air distribution system 102 includes a plurality of flow control devices 104, a plurality of manifolds 106, and a plurality of apertures 108. Alternatively, at least one blade 22 includes an assembly 110. In the exemplary embodiment, each assembly 110 is substantially similar, however, at least one assembly 110 may be different than at least one other assembly 110. Further, although in the exemplary embodiment each assembly 110 includes a flow control device 104, at least two assemblies 110 may share a common flow control device 104.

Flow control device 104 is, for example, a pump, a compressor, a fan, a blower, and/or any other suitable device for controlling a flow of a fluid. In one embodiment, flow control device 104 and/or assembly 110 includes a valve (not shown) that is configured to regulate a flow within air distribution system 102, such as a flow rate and/or a flow direction. In the exemplary embodiment, flow control device 104 is reversible for changing a direction of a fluid flow 112. Further, in the exemplary embodiment, air distribution system 102 includes one flow control device 104 for each blade 22 of wind turbine 10, however, it should be understood that air distribution system 102 can include any suitable number of flow control devices 104. Control system 36 is in operational control communication with each flow control device 104 for controlling fluid flows through air distribution system 102. Control system 36 may be directly coupled in operational control communication with each flow control device 104 and/or may be coupled in operational control communication with each flow control device 104 via a communication hub and/or any other suitable communication device(s).

Each flow control device 104 is in flow communication with at least one manifold 106. When one centralized flow control device 104 is used, flow control device 104 is in flow communication with each manifold 106 of air distribution system 102. In the exemplary embodiment, a flow control device 104 is coupled within a respective blade 22 at a root end 114 of each manifold 106 and/or a root portion 24 of each blade 22. Alternatively, flow control device 104 may be in any suitable position within wind turbine 10 and/or on supporting surface 14 (shown in FIG. 1) with respect to at least one manifold 106.

In the exemplary embodiment, each manifold 106 is at least partially defined along an interior surface 116 within respective blade 22 and extends generally along a respective pitch axis 34 (shown in FIG. 1) from root end 114 of manifold 106 to a tip end 118 of manifold 106. It should be understood that tip end 118 is not necessarily positioned within a tip 44 of blade 22, but rather, is positioned nearer to tip 44 than manifold root end 114. In one embodiment, apertures 108 are defined at a predetermined portion 120 of a length of blade 22 from root end 114 within tip end 118. Further, it should be understood that manifold 106 may have any suitable configuration, cross-sectional shape, length, and/or dimensions that enables air distribution system 102 and/or flow control system 100 to function as described herein. It should also be understood that one or more components of blade 22 can be used to form manifold 106.

In the exemplary embodiment, air distribution system 102 also includes at least one aperture 108 in flow communication with respective manifold 106. More specifically, in the exemplary embodiment, air distribution system 102 includes a plurality of apertures 108 defined along a suction side 122 of respective blade 22. Although apertures 108 are shown as being aligned in a line along suction side 122, it should be understood that apertures 108 may be positioned anywhere along suction side 122 of blade 22 that enables flow control system 100 to function as described herein. Alternatively or additionally, apertures 108 are defined through a pressure side 124 of blade 22. In the exemplary embodiment, aperture 108 is defined though an outer surface 126 of blade 22 for providing flow communication between manifold 106 and ambient air 128.

Flow control devices 104 are, in the exemplary embodiment, in flow communication with ambient air 128 via an opening 130 defined between hub 20 and a hub cover 132. Alternatively, wind turbine 10 does not include hub cover 132, and ambient air 128 is drawn into air distribution system 102 through an opening 130 near hub 20. In the exemplary embodiment, flow control devices 104 are configured to draw in ambient air 128 though opening 130 and to discharge fluid flow 112 generated from ambient air 128 into respective manifold 106. Alternatively, opening 130 may be defined at any suitable location within hub 20, nacelle 16, blade 22, tower 12, and/or auxiliary device (not shown) that enables air distribution system 102 to function as described herein. Further, air distribution system 102 may include more than one opening 130 for drawing air into air distribution system 102, such as including one opening 130 for each flow control device 104. In an alternative embodiment, a filter is included within opening 130 for filtering air 128 entering air distribution system 102. It should be understood that the filter referred to herein can filter particles from a fluid flow and/or separate liquid from the fluid flow.

Referring to FIG. 3, in one embodiment, flow control system 100 includes detection system 300. Detection system 300 includes an isolation device 302. Isolation device 302 includes four bellows 304, 306, 308, and 310. Alternatively, isolation device 302 includes only two bellows 304 and 306. In the exemplary embodiment, bellows 304, 306, 308, and 310 are coupled to an outer surface 312 of a conduit 314 and are configured to expand and retract. More specifically, when bellows 304, 306, 308, and/or 310 are expanded, bellows 304, 306, 308, and/or 310 contact interior surface 116 of manifold 106 to facilitate preventing fluid flow 112 through a portion 316 of manifold 106 adjacent isolation device 302. Further, when bellows 304, 306, 308, and/or 310 are expanded, isolation device 302 partitions manifold 106 into two or more chambers, such as chambers 318, 320, and/or 322, shown in FIG. 3 and described in more detail below.

Conduit 314 is configured to be inserted into manifold 106 when bellows 304, 306, 308, and 310 are retracted. Between bellows 306 and 308, at least a portion of outer surface 312 of conduit 314 is configured to be air-permeable. Conduit 314 and a portion 324 of manifold 106 between bellows 306 and bellows 308 define a testing chamber 318 when bellows 306 and 308 are expanded. In the exemplary embodiment, conduit 314 between bellows 304 and 306 and bellows 308 and 310 is also air-permeable and defines a first reference chamber 320 and a second reference chamber 322. First reference chamber 320 is defined when bellows 304 and 306 are expanded, and second reference chamber 322 is defined when bellows 308 and 310 are expanded. When detection system 300 does not include bellows 308 and 310, isolation device 302 does not include second reference chamber 322.

Detection system 300 also includes, in the exemplary embodiment, a first reference pressure sensor 326, a test pressure sensor 328, and a second reference pressure sensor 330. First reference pressure sensor 326 is positioned within first reference chamber 320, test pressure sensor 328 is positioned within testing chamber 318, and second reference pressure sensor 330 is positioned within second reference chamber 322. Sensors 326, 328, and 330 are coupled in communication with control system 36 for transmitting pressure data to control system 36, as described in more detail with respect to FIG. 10. In the exemplary embodiment, when apertures 108 within portion 324 are substantially free of debris, a pressure ($P_{reference}$) within testing chamber 318 is a predetermined percentage and/or any suitable amount below at least a pressure ($P_{ref1}$) within first reference chamber 320. The predetermined percentage and/or other suitable amount defines a threshold ($X_{pressure}$), which is determined empirically and/or by any suitable method. Such a relationship is represented by the following equation:

$$\frac{P_{reference}}{P_{ref1}} \le X_{pressure}, \text{ where } 0 < X_{pressure} \le 1 \quad \text{(Eq. 1)}$$

Alternatively, or additionally, a differential pressure ($\Delta P$) is measured and the differential pressure ($\Delta P$) is compared to a threshold ($P_{threshold}$) using the following equation:

$$\Delta P = P_{ref1} - P_{reference} \le P_{threshold} \quad \text{(Eq. 2)}$$

The threshold ($P_{threshold}$) is any suitable pressure that enables detection system 300 to function as described herein. In one embodiment, the threshold ($P_{threshold}$) is equal to about $0.1 * P_{ref1}$.

In a particular embodiment, when apertures 108 within portion 324 are substantially free of debris, a volumetric flow rate ($Q_{clean}$) generates a pressure ($P_{reference}$) within testing chamber 318 that is higher than at least the pressure ($P_{ref1}$) within first reference chamber 320. By comparing the pressure ($P_{reference}$) within testing chamber 318 with the pressure ($P_{ref1}$) within first reference chamber 320, a relationship between a pressure difference ($\Delta P_1$) and a volumetric flow rate in a clean state is given by the equation:

$$\Delta P_1 = P_{reference}(Q_{clean}) - P_{ref1} \quad \text{(Eq. 3)}$$

Equation 3 is a function that varies with atmospheric conditions, span, operation conditions and other suitable conditions. During a testing mode of wind turbine 10, a volumetric flow rate ($Q_{fouled}$) is channeled through a substantially fouled air distribution system 102 and/or flow control system 100, which generates a pressure ($P_{fouled}$) within testing chamber 318. A relationship between a pressure difference ($\Delta P_2$) and a volumetric flow rate in a fouled state is given by the equation:

$$\Delta P_2 \le P_{fouled}(Q_{fouled}) - P_{ref1} \quad \text{(Eq. 4)}$$

The fouling state of air distribution system 102 and/or flow control system 100 is determined by comparing the pressure difference ($\Delta P_1$) in the clean state to the pressure difference ($\Delta P_2$) in the fouled state using the following equation:

$$\Delta P_2 - \Delta P_1 > \Delta P_{threshold}, \quad \text{(Eq. 5)}$$

where the threshold ($\Delta P_{threshold}$) is any suitable pressure that enables detection system 300 to function as described herein. Alternatively, the comparison between the pressure difference ($\Delta P_1$) and the pressure difference ($\Delta P_2$) can be performed using any suitable mathematic operation(s). It should be understood that a pressure $P_{ref2}$ within second reference chamber 322 can be used to perform calculations similar to the calculations performed using pressure $P_{ref1}$ and/or can be used in combination with pressure $P_{ref1}$ to perform the calculations described herein.

In the exemplary embodiment, detection device 300 can also be used to selectively clean apertures 108 and/or manifold 106 by isolating testing chamber 318 from a remaining portion 332 of manifold 106. For example, when a cleaning agent is channeled through manifold 106 for cleaning apertures 108, the cleaning agent is channeled into conduit 314 by expanded bellows 304. The cleaning agent is then discharged from testing chamber 318 into manifold 106 and through apertures 108 within portion 324. Alternatively, or additionally, air is channeled through detection device 300 to particular apertures 108 for cleaning thereof. As such, detection device 300 selectively channels the cleaning agent to portion 324 of manifold 106 and associated apertures 108. In such an embodiment, detection device 300 applies a concentrated cleaning action to apertures 108. In the exemplary embodiment, the cleaning action applied by detection device 300 includes, but is not limited to including, soaking, brushing, vacuuming, blowing, jetting, punching, and/or spraying. In a particular embodiment, detection device 300 is a Rovver® robotic crawler manufactured by General Electric Company that is configured to detect fouling and/or perform cleaning as described herein (Rovver is a registered trademark of Envirosight, LLC of Randolph, N.J.).

In one embodiment, detection device 300 is sized such that first reference chamber 320 and/or second reference chamber 322 prevents fluid flow 112 and/or the cleaning agent from being discharged from apertures 108 other than apertures 108 within portion 324. In one embodiment, a length $L_1$ of detection device 300 is selected such that first reference chamber 320 and second reference chamber 322 are each adjacent to at least one aperture 108.

Referring to FIG. 4, in an alternative embodiment, flow control system 100 includes detection system 400. Detection system 400 includes at least one external light sensor 402 and at least one internal light sensor 404. Although one external light sensor 402 and two internal light sensors 404 are shown in FIG. 4 and described herein, it should be understood that detection system 400 can include any suitable number of external light sensors 402 and/or internal light sensors 404. In a particular embodiment, at least one sensor positioned within flow control system 100 and/or air distribution system 102 is configured to measure external light using lenses, tubes, and/or any other suitable components that enable detection system 400 to function as described herein. In the exemplary embodiment, external light sensor 402 and internal light sensors 404 are coupled in communication with control system 36 for transmitting data to control system 36, as described in more detail below.

External light sensor 402 is positioned on outer surface 126 of blade 22 adjacent to portion 120 of blade 22 having apertures 108 defined therethrough. External light sensor 402 is configured to detect and/or measure an amount of ambient light ($L_{amb}$). Internal light sensor 404 is positioned within manifold 106 to detect and/or measure an amount of light ($L_{manifold}$) entering manifold 106 through at least one aperture 108. When apertures 108 and/or manifold 106 is substantially free of debris, a ratio of light ($L_{manifold}$) to light ($L_{amb}$) is greater than, or equal to, a predetermined threshold ($X_{Light1}$), which is determined empirically and/or by any suitable method. Such a relationship is represented by the following equation:

$$\frac{L_{manifold}}{L_{amb}} \geq X_{Light1}, \text{ where } 0 < X_{Light1} \leq 1. \tag{Eq. 6}$$

Although a ratio is referred to herein, it should be understood that the predetermined threshold ($X_{Light1}$) can be compared to any suitable value, such as a differential.

Referring to FIGS. 5 and 6, in a further alternative embodiment, flow control system 100 includes detection system 500. Detection system 500 includes a glass fiber 502 and a light source 504 configured to emit light 506 through glass fiber 502. Alternatively, detection system 500 includes any suitable light source and/or light conductor that enables detection system 500 to function as described herein. In the exemplary embodiment, glass fiber 502 is formed from any suitable material that enables detection system 500 to function as described herein, such as fiber optic cable. Glass fiber 502 is embedded in a skin 510 of blade 22 at least partially adjacent to manifold 106. More specifically, in the exemplary embodiment, glass fiber 502 includes a first cable 514 and a second cable 516 within skin 510. In the exemplary embodiment, first cable 514 is coupled to light source 504, and second cable 516 is coupled in light transmitting communication with a light receiver 512. Light receiver 512 is positioned within root portion 24 of blade 22 and is in light transmitting communication with control system 36. Light source 504 is configured to emit light 506 through first cable 514 and light receiver is configured to receive light from second cable 516. In the exemplary embodiment, control system 36 is in operational control communication with light source 504 for selectively emitting light 506 through glass fiber 502. Although light source 504 and light receiver 512 are described as being positioned in root portion 24 of blade 22, it should be understood that light source 504 and/or light receiver 512 may be in any suitable position within wind turbine 10.

Detection system 500 further includes at least one transmitter 518 and at least one receiver 520. In the exemplary embodiment, transmitter 518 and receiver 520 are each lenses. Transmitter 518 is coupled in communication with first cable 514 of glass fiber 502 for emission of light 506 from transmitter 518. Receiver 520 is positioned to receive emitted light ($L_{emitted}$) and communicate a measurement of light received ($L_{received}$) to light receiver 512 via second cable 516. In one embodiment, receiver 520 is configured to reflect light ($L_{reflected}$) to transmitter 518, and transmitter 518 is configured to receive reflected light ($L_{reflected}$) and communicate a measurement of emitted light ($L_{emitted}$) and a measurement of reflected light ($L_{reflected}$) to control system 36. In the exemplary embodiment, when flow control system 100 is substantially free of debris at transmitter 518 and receiver 520, a ratio of emitted light ($L_{emitted}$) to received light ($L_{received}$) is less than, or equal to, a threshold ($X_{Light2}$), which is determined empirically and/or by any suitable method. Such a relationship is represented by the following equation:

$$\frac{L_{received}}{L_{emitted}} \geq X_{Light2}, \text{ where } 0 < X_{Light2} \leq 1. \tag{Eq. 7}$$

As such, at interrupted or diminished light reception, fouling of flow control system 100 is detected. Although a ratio is referred to herein, it should be understood that the threshold ($X_{Light2}$) can be compared to any suitable value, such as a differential.

In the exemplary embodiment, at least one transmitter 518 and receiver 520 pair is positioned proximate at least one aperture 108 as shown in FIG. 6. More specifically, transmitter 518 is coupled through a wall 134 defining aperture 108, and receiver 520 is coupled to wall 134 opposite transmitter 518. Alternatively, a plurality of transmitter 518 and receiver 520 pairs are positioned proximate a plurality of respective apertures 108 are coupled in series or parallel such that detection system 500 includes a plurality of transmitters 518 and a plurality of receivers 520. Additionally or alternatively, transmitter 518 and receiver 520 are positioned within manifold 106, opening 103 (shown in FIG. 2), flow control device 104, and/or any other suitable location that may accumulate debris. Further, transmitter 518 and/or receiver 520 can be embedded is a strip that is inserted into the mould of blade 22 such that transmitter 518 and/or receiver 520 are pre-fabricated into blade 22. As such, alignment of transmitter 518 and receiver 520 is simplified.

It should be understood that detection system 300, 400, and/or 500 can be used singly or in combination to perform the methods described herein. Further, detection systems 300, 400, and/or 500 can be permanently installed within flow control system 100 and/or temporarily installed within flow control system 100.

Referring again to FIG. 2, during a flow control operation, flow control system 100 is used to provide AFC for wind turbine 10. More specifically, control system 36 controls air distribution system 102 to draw in ambient air 128 and discharge fluid flow 112 through at least one aperture 108. Operation of one assembly 110 will be described herein, however, it should be understood that in one embodiment each assembly 110 functions similarly. Further, assemblies 110 can be controlled to operate in substantial synchronicity and/or each assembly 110 may be controlled separately such that a fluid flow about each blade 22 may be manipulated independently. When assemblies 110 are controlled in synchronicity, flow control system 100 can be controlled by control system 36 to maintain a predetermined load spectrum, power level, and/or noise level. In the exemplary embodiment, control system 36 controls flow control device 104 to draw in ambient air 128 to generate fluid flow 112 having one or more predetermined parameters, such as a velocity, a mass flow rate, a pressure, a temperature, and/or any suitable flow parameter. Flow control device 104 channels fluid flow 112 through manifold 106 from root end 114 to tip end 118. It should be understood that any suitable control methods and/or components, such as pitching blade(s) 22, can alternatively or additionally be used to control a load spectrum, a power level, and/or a noise level of wind turbine 10.

As fluid flow 112 is channeled through manifold 106, fluid flow 112 is discharged from air distribution system 102 and flow control system 100 through apertures 108. Discharged fluid flow 112 facilitates manipulating at least a boundary layer of a fluid flow across outer surface 126 of blade 22. More specifically, discharging fluid flow 112 at suction side 122 of blade 22 increases the lift on blade 22, which increases the power generated by wind turbine 10. Alternatively, flow control device 104 may be operated to draw in ambient air 128 through apertures 108 into manifold 106 for discharge from nacelle 16, hub 20, and/or any other suitable location. As such, ambient air 128 is drawn in from the boundary layer to manipulate the boundary layer.

Figure 7:
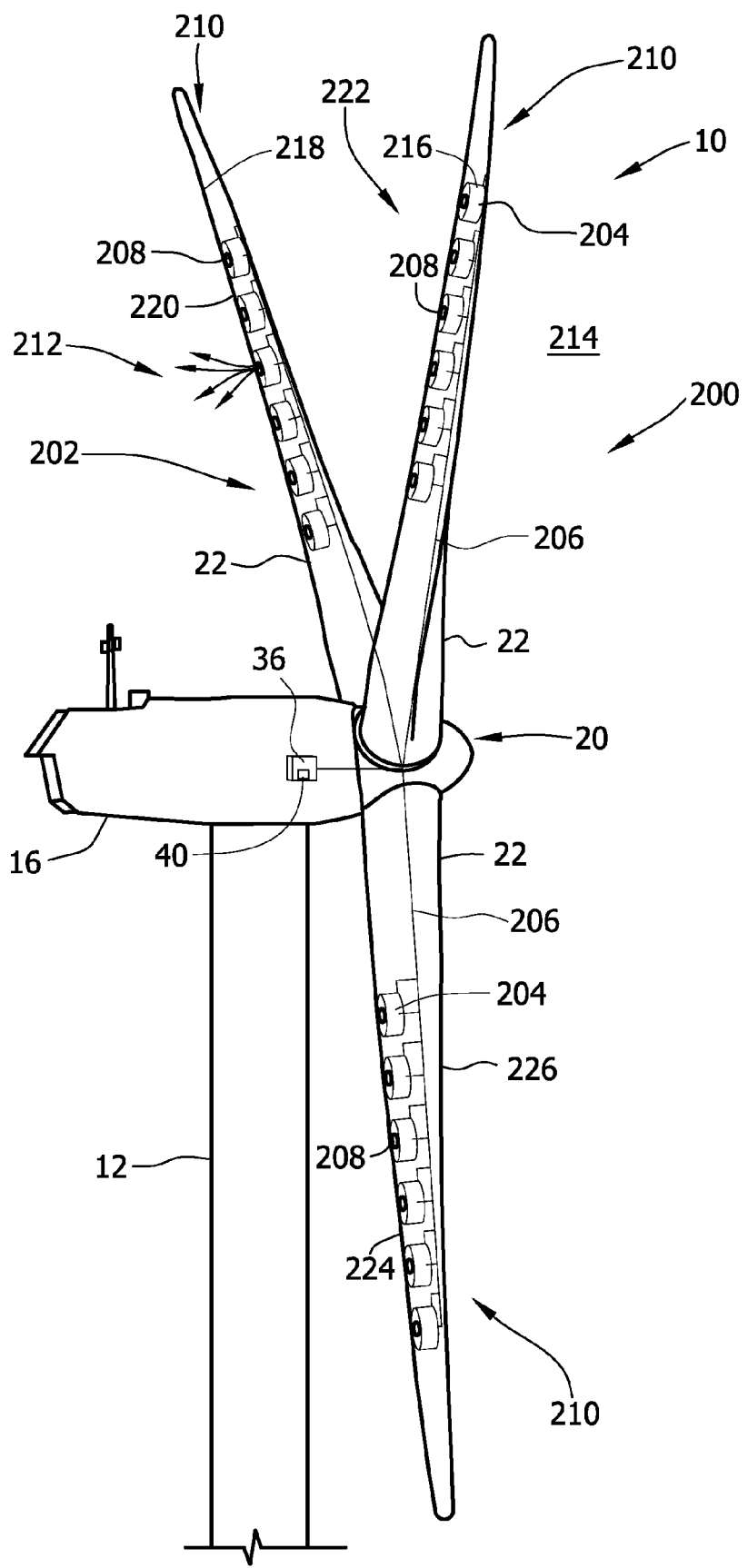
Figure 8:
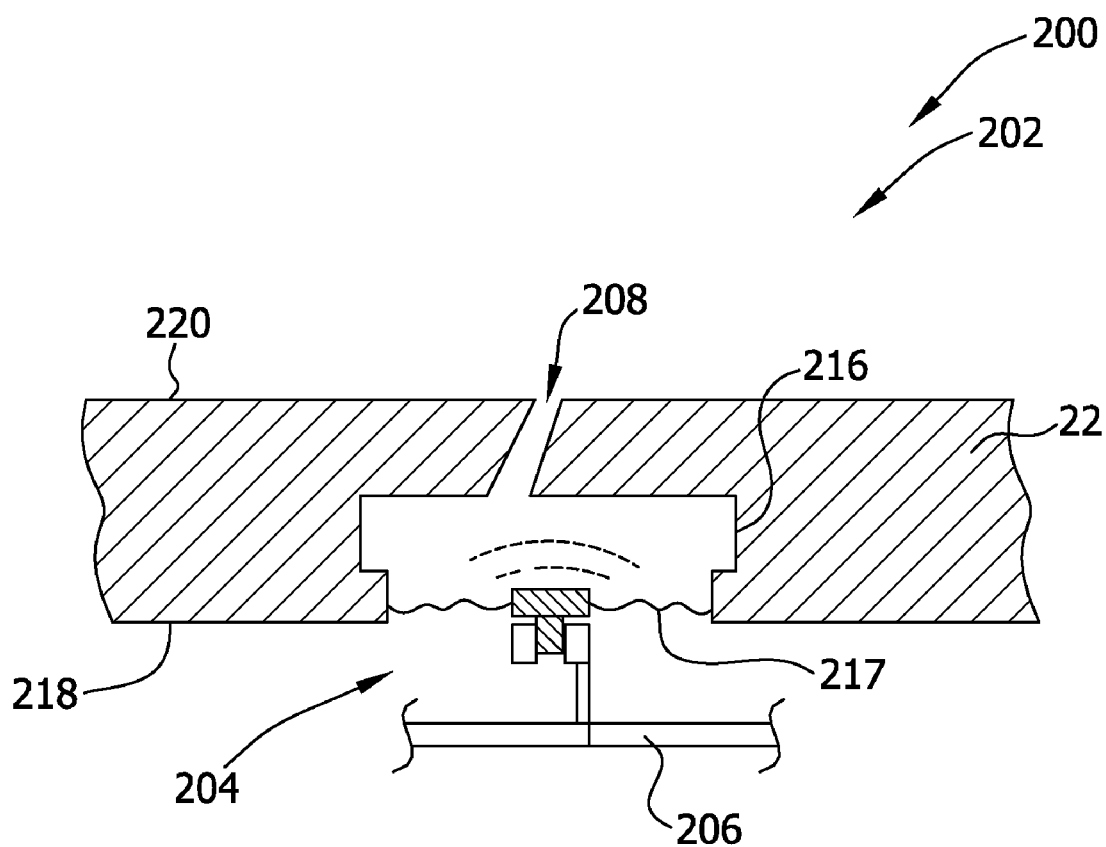

FIG. 7 is a schematic view of an exemplary alternative flow control system 200 that may be used with wind turbine 10. FIG. 8 is an enlarged cross-sectional view of a portion of flow control system 200. Components shown in FIG. 1 are labeled with similar reference numbers in FIGS. 7 and 8. In the exemplary embodiment, flow control system 200 is a zero-net-mass flow control system that includes an air distribution system 202. Control system 36 may be considered as a component of flow control system 200 and is in operational control communication with air distribution system 202.

Air distribution system 202 includes at least one actuator 204, at least one communication link 206, and at least one aperture 208. Actuator 204, communication link 206, and apertures 208 define an assembly 210. In the exemplary embodiment, each blade 22 includes a respective assembly 210. As such, in the exemplary embodiment, air distribution system 202 includes a plurality of actuators 204, communication links 206, and apertures 208. Alternatively, air distribution system 202 includes one common communication link 206 for assemblies 210. In an alternative embodiment, at least one blade 22 includes an assembly 210 having communication link 206. In one embodiment, communication link 206 provides operational control communication between control system 36 and at least one actuator 204. In the exemplary embodiment, communication link 206 provides operational control communication between control system 36 and a plurality of actuators 204 within an assembly 210. Communications links 206 may be directly coupled in communication with control system 36 and/or in communication with control system 36 via a communications hub and/or any other suitable communication device. In one embodiment, actuator 204, communication link 206, and/or aperture 208 are at least partially defined in blade 22.

Actuator 204 is, in the exemplary embodiment, any known or contemplated actuator configured to form a synthetic jet 212 of fluid. As used herein, the term "synthetic jet" refers to a jet of fluid that is created by cyclic movement of a diaphragm and/or piston 217, where the jet flow is synthesized from the ambient fluid. Synthetic jet 212 may be considered a fluid flow through flow control system 200. In one embodiment, actuator 204 includes a housing 216 and a diaphragm and/or a piston 217 within housing 216. Diaphragm and/or piston 217 can be mechanically, piezoelectrically, pneumatically, magnetically, and/or otherwise controlled to form synthetic jet 212. In the exemplary embodiment, actuator 204 is coupled to an interior surface 218 of blade 22 and is aligned with aperture 208 such that synthetic jet 212 and/or ambient air 214 flows through aperture 208.

Aperture 208 is defined within blade 22, and, more specifically, through an outer surface 220 of blade 22. Further, in the exemplary embodiment, at least one assembly 210 of air distribution system 202 includes a plurality of actuators 204 and a plurality of apertures 208. As such, air distribution system 202 includes an array 222 of apertures 208 defined through blade 22. In the exemplary embodiment, apertures 208 are defined along a suction side 224 of each blade 22. Although apertures 208 and/or actuators 204 are shown as being aligned in a line along suction sides 224, it should be understood that apertures 208 and/or actuators 204 may be positioned anywhere along suction side 224 of blade 22 that enables flow control system 200 to function as described herein. Additionally or alternatively, apertures 208 are defined through a pressure side 226 of blade 22, and/or actuators 204 are coupled to interior surface 218 of any suitable side of blade 22. In the exemplary embodiment, aperture 208 is configured to provide flow communication between a respective actuator housing 216 and ambient air 214.

It should be understood that flow control system 200 may include other suitable components to cleaning and/or maintaining components of wind turbine 10 depending on a configuration of wind turbine 10. For example, flow control system 200 can include a fluid distribution system configured to channel a fluid into air distribution system 202.

During a flow control operation, flow control system 200 is used to provide AFC for wind turbine 10. More specifically, control system 36 controls air distribution system 202 to draw in ambient air 214 and generate synthetic jet 212 through at least one aperture 208. Operation of one assembly 210 will be described herein, however, it should be understood that each assembly 210 functions similarly. Further, assemblies 210 can be controlled to operate in substantial synchronicity and/or each assembly 210 may be controlled separately such that a fluid flow about each blade 22 may be manipulated separately. When assemblies 210 are controlled in synchronicity, flow control system 200 can be controlled by control system 36 to maintain a predetermined load spectrum, power level, and/or noise level. In the exemplary embodiment, control system 36 instructs actuator 204 to alternately draw ambient air 214 into housing 216 (also referred to herein as a "breath-in stroke") and discharge synthetic jet 212 (also referred to herein as a "breath-out stroke") from housing 216 using diaphragm and/or piston 217 to generate synthetic jet 212 having one or more predetermined parameters, such as a velocity, a mass flow rate, a pressure, a temperature, and/or any suitable flow parameter. Synthetic jets 212 facilitate manipulating at least a boundary layer of a fluid flow across outer surface 220 of blade 22. More specifically, discharging synthetic jets 212 at suction side 224 of blade 22 increases the lift on blade 22, which increases the power generated by wind turbine 10. It should be understood that any suitable control methods and/or components, such as pitching blade(s) 22, can alternatively or additionally be used to control a load spectrum, a power level, and/or a noise level of wind turbine 10.

FIG. 9 is a flowchart of a method 600 of operating wind turbine 10 (shown in FIG. 1). By performing method 600, fouling of blade 22 (shown in FIG. 1) and/or flow control system 100 (shown in FIG. 2) and/or flow control system 200 (shown in FIG. 7) is facilitated to be corrected and/or prevented. Method 600 is performed at least partially by control system 36 (shown in FIG. 1) sending or transmitting commands and/or instructions to components of wind turbine 10, such as air distribution system 102 and/or 202 (shown in FIGS. 2 and 7), detection systems 300, 400, and/or 500 (shown in FIGS. 3-6), and/or any other suitable component. Processor 40 (shown in FIG. 1) within control system 36 is programmed with code segments configured to perform method 600. Alternatively, method 600 is encoded on a computer-readable medium that is readable by control system 36. In such an embodiment, control system 36 and/or processor 40 is configured to read computer-readable medium for performing method 600.

In the exemplary embodiment, method 600 is performed periodically according to a predetermined corrective schedule, a predetermined preventative schedule, condition-triggered automated operation, and/or condition-triggered manual operation. In a particular embodiment, control system 36 performs method 600 after control system 36 and/or a human operator determines optimal conditions exist, such as a low power-generating time period, a low wind speed time period, a high wind speed time period, and/or any optimal time period, for performing method 600. Alternatively, or additionally, control system 36 is configured to determine when fouling has occurred and/or will occur and perform method 600 upon making such a determination. In the exemplary embodiment, method 600 is also performed to correct and/or prevent an icing condition on blade 22 by using a de-icing agent, such as an alcohol, within flow control system 100 and/or 202. Further, method 600 is performed to prevent fouling of blade 22 and/or flow control system 100 and/or 200 by using a non-binding coating agent, such as a wax, to form a non-binding surface layer on blade 22 and/or within flow control system 100 and/or 200. Method 600 used for de-icing and/or for forming a non-binding surface layer can be performed by control system 36 according to a predetermined seasonal schedule and/or selectively by an operator of control system 36.

Referring to FIGS. 1, 2, and 9, in the exemplary embodiment when wind turbine 10 includes nonzero-net-mass flow control system 100, method 600 includes operating 602 wind turbine 10 in a first or normal mode. As used with respect to flow control system 100, the term "normal mode" refers to a mode of operating wind turbine 10, flow control system 100, and/or air distribution system 102 such that flow control system 100 and/or air distribution system 102 drives a flow 112 of fluid to increase lift on blade 22. The normal mode includes normal operation over a substantially entire power curve; operating when a wind speed is too low to generate power but wind turbine 10 is prepared to generate power; using constant and variable speed-ranges; operating within a peak shaver range; operating in an above rated condition; and/or performing a storm cut out. Flow characteristics of fluid flow 112 during the normal mode are determined empirically and/or are predetermined to achieve optimal lift on blade 22 depending on ambient conditions, such as a wind speed and/or a wind direction, precipitation, and/or other atmospheric and/or environmental conditions. At least one flow characteristic of fluid flow 112 may be adjusted and/or varied during the normal mode, based on changing ambient conditions and/or operating characteristics of wind turbine 10, to facilitate achieving optimal blade lift.

Flow control system 100 and/or air distribution system 102 is operated 602 in the normal mode according to a certain schedule and/or based on wind turbine data. In one embodiment, control system 36 operates 602 flow control system 100 and/or air distribution system 102 in the normal mode by: acquiring current and/or historical data measured on wind turbine 10, such as wind speed, temperature, a rotor component position, a rotor component speed, a rotor component acceleration, forces at several points of wind turbine 10, and/or moments at several points of wind turbine 10; applying algorithms, such as models and/or maps, to the acquired data; and computing a best possible actuation, such as a state of flow control device 104. For example, when wind speeds are high, operation 602 of flow control system 100 is substantially terminated because increased lift on blade 22 is not desired in such wind conditions. However, even when active flow control is terminated, enough fluid is discharged from aperture 108 to facilitate preventing insects from flying into air distribution system 102. Such termination of active flow control is considered an off mode.

To actively trigger the AFC response of flow control system 100, wind turbine 10 is operated 604 in a second mode that is different than the normal mode. As used herein with respect to flow control system 100, the term "second mode" refers to a mode of operating wind turbine 10, flow control system 100, and/or air distribution system 102 to achieve an outcome in addition to or different than optimal lift on blade 22. In the exemplary embodiment, during the second mode, control system 36 controls flow control system 100 and/or air distribution system 102 to facilitate altering the AFC response of flow control system 100 and/or air distribution system 102. In particular embodiments, the second mode is a cleaning mode and/or a preventative mode. It should be understood that wind turbine 10 can be operated in more than two modes. For example, wind turbine 10 can further be operated in an ordinary operation mode, a full flow capacity mode, a non-zero flow mode, and/or a cleaning mode.

In the exemplary embodiment, during the second mode, a level of AFC response of flow control system 100 is varied over a period of time. For example, the level of AFC response is varied among an off level, a partial flow rate level, and/or a full flow rate level over the time period. Control system 36 may vary the AFC response of flow control system 100 depending on ambient and/or environmental conditions, such as rain, fog, and/or insect load, and/or on operational parameters, such as at low wind speed and/or at above rated wind speed, which is an above rated wind speed with flow control system 100 in the off mode. Such conditions are determined and/or measured using environmental sensor 42 included within or on wind turbine 10. During predetermined conditions, control system 36 can modify pitch settings according to an AFC response level desired for detection and/or cleaning.

For example, when wind turbine 10 is operating at below rated power, flow control system 100 usually operates 602 in the normal mode. However, during the second mode, a pitch angle of at least one blade 22 is altered to determine a pitch angle at which a stall occurs. Flow control system 100 usually delays the occurrence of a stall. As such, when the occurrence of a stall is not delayed substantially as designed or as in a clean condition, it may be determined that flow control system 100 is not functioning effectively. In another example, during the second mode, flow control system 100 can be operated 604 in the off mode to analyze power output and/or other parameters of wind turbine 10 with respect to the AFC response of flow control system 100.

Control system 36 acquires 606 operational data of wind turbine 10 during at least the second mode and determines 608 an effectiveness of flow control system 100 using the acquired operational data. The operational data used to perform the determination 608 includes design data, current operational data and/or historical operational data. In the exemplary embodiment, control system 36 acquires 606 power output data to generate a power curve. By varying the level of AFC response of flow control system 100 during the second mode, the effectiveness of flow control system 100 can be determined 608. By comparing power curves, effects of ambient conditions can be substantially eliminated by repeatedly acquiring power curve measurements to eliminate short term variation in ambient conditions.

Additionally or alternatively control system 36 acquires 606 measurements of loads in each blade 22, a shaft, and/or other suitable components, i.e. a load spectrum, to enable monitoring of an AFC effectiveness for each blade 22, the shaft, and/or other components because flow control system 100 affects blade lift and drag. For example, blade sectional load measurements across a span of each blade 22 can be acquired 606 to determine 608 a local AFC effectiveness, and/or blade root bending moments for each blade 22 can be acquired 606 to determine 608 the AFC effectiveness for each blade 22. By monitoring each blade 22, one or more blades 22 can be tuned and/or maintained independently to achieve optimal lift during the normal mode.

In parallel, or alternatively, to acquire 606 data related to the effectiveness of flow control system 100, internal quantities of flow control system 100 can be acquired 606 with respect to time. The internal quantities include a power required in flow control device 104 to discharge fluid flow 112 from air distribution system 102, as a function of ambient and operational variables; pressure and flow rate of flow control device 104; and/or pressure and flow rate in at least one manifold 106 of air distribution system 102. Data regarding the internal quantities can be used to detect and/or monitor patterns over a time period. From the time-dependent patterns, the effectiveness of flow control system 100 is determined 608. For example, if the power needed to generate a given fluid flow 112 increases, control system 608 determines that the effectiveness of flow control system 100 has decreased. Further, if pressure and/or flow rates within flow control system 100 decrease, control system 36 determines 608 that the effectiveness of flow control system 100 has decreased. The determined 608 effectiveness can be used for monitoring wind turbine 10, transmitting a warning, transmitting an alarm, controlling wind turbine 10 and/or flow control system 100, and/or any other suitable purpose.

In an alternative embodiment, control system 36 acquires 606 a noise measurement and/or acquires 606 a measurement of a light, such as a point, line, and/or other suitable configuration, emitted from tower 12 by using a camera. Control system 363 may also be configured to emit light from apertures 108 defined through blade 22 and photograph the emitted light to determine 608 the effectiveness of flow control system 100. Further, control system 36 can also acquire 606 operational data during the normal mode for comparison with the operational data acquired 606 during the second mode. At any time after the operational data has been acquired 606, wind turbine 10 can return to operating 612 in the first mode.

Based on the effectiveness of flow control system 100, control system 36 performs 610 an action. The action is at least one of continuing to acquire 606 operational data, transmitting a warning signal to an operator of wind turbine 10, transmitting an alarm signal to the operator of wind turbine 10, changing a mode of operation of wind turbine 10, and/or shutting down wind turbine 10. In one embodiment, a series of actions increasing in severity level are performed over time. When such a series of actions are performed there is a time interval between each action in the series. In the exemplary embodiment, any transmission to the operator is a "smart message" that includes a determination by control system 36 as to what may be causing any detected transient in wind turbine operation. In a particular embodiment, control system 36 performs 610 a plurality of actions, such as transmitting the warning signal to an operator without changing a mode of operation of wind turbine 10 and continuing to acquire 606 operational data, when the effectiveness of flow control system 100 does not increase, performing a cleaning mode to facilitate removing debris from flow control system 100, when the effectiveness of flow control system 100 still does not increase, transmitting an alarm signal to the operator requesting that the operator take an action.

In the exemplary embodiment, when the action includes changing the mode of operation of wind turbine 10, control system 36 detects a state of fouling, detects an opportunity to correct the fouling, such as during a period of precipitation and/or a period of low wind speed detected using sensor 42, and operates wind turbine 10 in a cleaning mode to facilitate removing debris from flow control system 100. A cleaning mode includes channeling a cleaning fluid into air distribution system 102 and/or varying an operation of flow control device 104 to dislodge debris. The cleaning mode can include modifying operational parameters, such as pitch settings and/or rotor speed, to facilitate cleaning flow control system 100.

In a particular embodiment, the cleaning mode includes using a cleaning device that is internal to air distribution system 102 as described above with respect to FIG. 3 and/or using a cleaning device that is external to air distribution system 102. When an external cleaning device (not shown) is used during the cleaning mode, the external cleaning device travels along length L of blade 22 on outer surface 126. Any suitable components, such as suction cups, rails, harnesses, cords, and/or wires, may be used to couple the external cleaning device to blade 22. Further, any suitable position indicators, such as striping, a grid, bar codes, and/or magnets, may be positioned on outer surface 126 of blade 22 and/or within air distribution system 102 to facilitate properly positioning a cleaning device. The external cleaning device is configured to apply localized cleaning to apertures 108 that were determined to be fouled. More specifically, the external cleaning device is positioned on outer surface 126 adjacent apertures 108 to be cleaned. In the exemplary embodiment, the cleaning device includes a positioning device, such as a global positioning system (GPS) device, to sense its location on wind turbine 10 and/or a recognition system, such as an optical recognition system, to properly localize its cleaning action. The external cleaning device uses any suitable cleaning agent, such as air, water, and/or detergent, and/or any suitable cleaning technique, such as soaking, brushing, vacuuming, blowing, jetting, punching, and/or spraying, to perform maintenance on flow control system 100 and/or air distribution system 102.

Referring to FIGS. 1, 7, and 9, in the exemplary embodiment when wind turbine 10 includes zero-net-mass flow control system 200, method 600 includes operating 602 wind turbine 10 in a first or normal mode. As used with respect flow control system 200, the term "normal mode" refers to a mode of operating wind turbine 10, flow control system 200, and/or air distribution system 202 such that flow control system 200 and/or air distribution system 202 generates synthetic jet 212 to modify lift on blade 22. The normal mode includes normal operation over a substantially entire power curve; operating when a wind speed is too low to generate power but wind turbine 10 is prepared to generate power; using constant and variable speed-ranges; operating within a peak shaver range; operating in an above rated condition; and/or performing a storm cut out. Flow characteristics of synthetic jet 212 during the normal mode are determined empirically and/or are predetermined to achieve optimal lift on blade 22 depending on ambient conditions, such as a wind speed and/or a wind direction, precipitation, and/or other atmospheric and/or environmental conditions. At least one flow characteristic of synthetic jet 212 may be adjusted and/or varied during the normal mode, based on changing ambient conditions and/or operating characteristics of wind turbine 10, to facilitate achieving optimal blade lift.

Flow control system 200 and/or air distribution system 202 is operated 602 in the normal mode according to a certain schedule and/or based on wind turbine data. In one embodiment, control system 36 operates 602 flow control system 200 and/or air distribution system 202 in the normal mode by: acquiring current and/or historical data measured on wind turbine 10, such as wind speed, temperature, a rotor component position, a rotor component speed, a rotor component acceleration, forces at several points of wind turbine 10, and/or moments at several points of wind turbine 10; applying algorithms, such as models and/or maps, to the acquired data; and computing a best possible actuation, such as a state of flow control device 104 and/or pitch adjustment system 32. For example, when wind speeds are high, operation 602 of flow control system 200 is substantially terminated because increased lift on blade 22 is not desired in such wind conditions. However, even when active flow control is terminated, enough fluid is discharged from aperture 208 to facilitate preventing insects from flying into air distribution system 202. Such termination of active flow control is considered an off mode.

To actively trigger the AFC response of flow control system 200, wind turbine 10 is operated 604 in a second mode that is different than the normal mode. As used herein with respect to flow control system 200, the term "second mode" refers to a mode of operating wind turbine 10, flow control system 200, and/or air distribution system 202 to achieve an outcome in addition to or different than optimal lift on blade 22. In the exemplary embodiment, during the second mode, control system 36 controls flow control system 200 and/or air distribution system 202 to facilitate altering the AFC response of flow control system 200 and/or air distribution system 202. In particular embodiments, the second mode is a cleaning mode and/or a preventative mode. It should be understood that wind turbine 10 can be operated in more than two modes. For example, wind turbine 10 can further be operated in an ordinary operation mode, a full flow capacity mode, a zero flow mode, and/or a cleaning mode.

In the exemplary embodiment, during the second mode, a level of AFC response of flow control system 200 is varied over a period of time. For example, the level of AFC response is varied among an off level, a partial flow rate level, and/or a full flow rate level over the time period. Control system 36 may vary the AFC response of flow control system 200 depending on ambient and/or environmental conditions, such as rain, fog, and/or insect load, and/or on operational parameters, such as at low wind and/or at above rated wind speed, which is an above rated wind speed with flow control system 200 in the off mode. Such conditions are determined and/or measured using environmental sensor 42 included within or on wind turbine 10. During predetermined conditions, control system 36 can modify pitch settings according to an AFC response level desired for detection and/or cleaning.

For example, when wind turbine 10 is operating at below rated power, flow control system 200 usually operates in the normal mode. However, during the second mode, flow control system 200 can be operated in the off mode to analyze power output and/or other parameters of wind turbine 20 with respect to AFC response of flow control system 200. In another example, during the second mode, a pitch angle of at least one blade 22 is altered to determine a pitch angle at which a stall occurs. Flow control system 200 usually delays the occurrence of a stall. As such, when the occurrence of a stall is not delayed substantially as designed, it may be determined that flow control system 200 is not functioning effectively.

Control system 36 acquires 606 operational data of wind turbine 10 during at least the second mode and determines 608 an effectiveness of flow control system 100 using the acquired operational data. The operational data used to perform the determination 608 includes current operational data and/or historical operational data. In the exemplary embodiment, control system 36 acquires 606 power output data to generate a power curve. By varying the level of AFC response of flow control system 200 during the second mode, the effectiveness of flow control system 200 can be determined 608. By comparing power curves, effects of ambient conditions can be substantially eliminated by repeatedly acquiring power curve measurements to eliminate short term variation in ambient conditions.

Additionally or alternatively control system 36 acquires 606 measurements of loads in each blade 22, a shaft, and/or other suitable components, i.e. a load spectrum, to enable monitoring of an AFC effectiveness for each blade 22, the shaft, and/or other components because flow control system 200 affects blade lift and drag. For example, blade sectional load measurements across a span of each blade 22 can be acquired 606 to determine 608 a local AFC effectiveness, and/or blade root bending moments for each blade 22 can be acquired 606 to determine 608 the AFC effectiveness for each blade 22. By monitoring each blade 22, one or more blades 22 can be tuned and/or maintained independently to achieve optimal lift during the normal mode.

In parallel, or alternatively, to acquire 606 data related to the effectiveness of flow control system 200, internal quantities of flow control system 100 can be acquired 606 with respect to time. The internal quantities include a power required in actuator 204 to discharge synthetic jet 212 from air distribution system 202, as a function of ambient and operational variables; and/or pressure and flow rate of actuator 212. Date regarding the internal quantities can be used to detect and/or monitor patterns over a time period. From the time-dependent patterns, the effectiveness of flow control system 200 is determined 608. For example, if the power needed to generate a given synthetic jet 212 increases, control system 36 determines that the effectiveness of flow control system 200 has decreased. Further, if pressure flow rates within flow control system 200 decrease, control system 36 determines 608 that the effectiveness of flow control system 200 has decreased.

In an alternative embodiment, control system 36 acquires 606 a noise measurement and/or acquires 606 a measurement of a light, such as a point, line, and/or other suitable configuration, emitted from tower 12 by using a camera. Control system 36 may further be configured to emit light from apertures 208 defined through blade 22 and photograph the emitted light to determine 608 the effectiveness of flow control system 200. Further, control system 36 can also acquire 606 operational data during the normal mode for comparison with the operational data acquired 606 during the second mode. At any time after the operational data has been acquired 606, wind turbine 10 can return to operating 612 in the first mode.

Based on the effectiveness of flow control system 200, control system 36 performs 610 an action. The action is at least one of continuing to acquire 606 operational data, transmitting a warning signal to an operator of wind turbine 10, transmitting an alarm signal to the operator of wind turbine 10, changing a mode of operation of wind turbine 10, and/or shutting down wind turbine 10. In one embodiment, a series of actions increasing in severity level are performed over time. When such a series of actions are performed there is a time interval between each action in the series. In the exemplary embodiment, any transmission to the operator is a "smart message" that includes a determination by control system 36 as to what may be causing any detected transient in wind turbine operation. In a particular embodiment, control system 36 performs 610 a plurality of actions, such as transmitting the warning signal to an operator without changing a mode of operation of wind turbine 10 and continuing to acquire 606 operational data, when the effectiveness of flow control system 200 does not increase, performing a cleaning mode to facilitate removing debris from flow control system 200, when the effectiveness of flow control system 200 still does not increase, transmitting an alarm signal to the operator requesting that the operator take an action.

In the exemplary embodiment, when the action includes changing the mode of operation of wind turbine 10, control system 36 detects a state of fouling, detects an opportunity to correct the fouling, such as during a period of precipitation and/or a period of low wind speed detected using sensor 42, and operates wind turbine 10 in a cleaning mode to facilitate removing debris from flow control system 200. A cleaning mode includes channeling a cleaning fluid into air distribution system 202 and/or varying an operation of actuator 204 to dislodge debris. The cleaning mode can include modifying operational parameters, such as pitch settings and/or rotor speed, to facilitate cleaning flow control system 200.

In a particular embodiment, the cleaning mode includes using a cleaning device that is external to air distribution system 202. When an external cleaning device (not shown) is used during the cleaning mode, the external cleaning device travels along length L of blade 22 on outer surface 220. Any suitable components, such as suction cups, rails, harnesses, cords, and/or wires, may be used to couple the external cleaning device to blade 22. Further, any suitable position indicators, such as striping, a grid, bar codes, and/or magnets, may be positioned on outer surface 220 of blade 22 and/or within air distribution system 202 to facilitate properly positioning a cleaning device. The external cleaning device is configured to apply localized cleaning to apertures 208 that were determined to be fouled. More specifically, the external cleaning device is positioned on outer surface 220 adjacent apertures 208 to be cleaned. In the exemplary embodiment, the cleaning device includes a positioning device, such as a global positioning system (GPS) device, to sense its location on wind turbine 10 and/or a recognition system, such as an optical recognition system, to properly localize its cleaning action. The external cleaning device uses any suitable cleaning agent, such as air, water, and/or detergent, and/or any suitable cleaning technique, such as soaking, brushing, vacuuming, blowing, jetting, punching, and/or spraying, to perform maintenance on flow control system 200 and/or air distribution system 202.

FIG. 10 is a flowchart of a method 700 of operating wind turbine 10 (shown in FIG. 1) that includes flow control system 100 (shown in FIG. 2) having detection system 300 (shown in FIG. 3). Method 700 includes at least some of the steps of method 600 (shown in FIG. 9) and, as such, similar steps are indicated with similar reference numbers. Processor 40 (shown in FIG. 1) within control system 36 is programmed with code segments configured to perform method 700. Alternatively, method 700 is encoded on a computer-readable medium that is readable by control system 36. In such an embodiment, control system 36 and/or processor 40 is configured to read computer-readable medium for performing method 700.

Referring to FIGS. 1-3 and 10, method 700 includes operating 702 wind turbine 10 in the normal mode, as described above. To actively trigger a different AFC response of flow control system 100, wind turbine 10 is operated 604 in the second mode. Operation 604 in the second mode includes positioning 704 isolation device 302 within manifold 106 of flow control system 100. More specifically, isolation device 302 is selectively positioned 704 within manifold 106 to determine fouling within a predetermined portion of flow control system 100. Isolation device 302 is activated 706 to partition manifold 106 into two or more chambers, such as chambers 318, 320, and/or 322. Specifically, control system 36 activates 704 bellows 304, 306, 308 and/or 310 of isolation device 302 to expand to partition manifold 106. Fluid flow 112 is channeled 708 into chambers 318, 320, and/or 322 within manifold 106.

Control system 36 acquires 606 operational data of wind turbine 10 during at least the second mode by determining 710 a first pressure ($P_{ref1}$, $P_{reference}$, and/or $P_{ref1}$) within one or more of first reference chamber 320, testing chamber 318, and/or second reference chamber 322, and determining 712 a second pressure ($P_{ref1}$, $P_{reference}$, and/or $P_{ref2}$) within one or more of first reference chamber 320, testing chamber 318, and/or second reference chamber 320. In the exemplary embodiment, control system 36 determines 710 pressure ($P_{reference}$) within testing chamber 318 and determines 712 pressure ($P_{ref1}$) within first reference chamber 320. Alternatively, control system determines 710 pressure ($P_{reference}$) within testing chamber 318 and determines 712 pressure ($P_{ref1}$) within first reference chamber 320 and pressure ($P_{ref1}$) within second reference chamber 322.

Control system 36 compares 714 the first pressure with the second pressure to determine 608 an effectiveness of flow control system 100. In the exemplary embodiment, where pressure ($P_{reference}$) is the first pressure and pressure ($P_{ref1}$) is the second pressure, control system 36 uses Equation 1 to compare 714 pressure ($P_{reference}$) with pressure ($P_{ref1}$). In an alternative embodiment, control system 36 uses Equation 2 to compare 714 pressure ($P_{reference}$) and pressure ($P_{ref1}$) to determine the pressure difference ($\Delta P$). Alternatively, control system 36 uses Equations 3-5 to compare 714 the pressure difference ($\Delta P_1$) to the pressure difference ($\Delta P_2$).

An effectiveness of flow control system 100 is determined 716 based on the comparison 714 of the at least two pressure values. More specifically, in the exemplary embodiment, control system 36 determines 716 a ratio of pressure ($P_{reference}$) to pressure ($P_{ref1}$) as the effectiveness of flow control system 100. Alternatively, control system 36 uses the volumetric flow rate ($Q_{clean}$) and the volumetric flow rate ($Q_{fouled}$) to determine 716 the effectiveness of flow control system 100. In the exemplary embodiment, when the ratio of pressure ($P_{reference}$) to pressure ($P_{ref1}$) is greater than threshold ($X_{pressure}$), control system 36 performs 718 a cleaning mode. Alternatively, when a difference between the pressure difference ($\Delta P_1$) and the pressure difference ($\Delta P_2$) is less than the threshold ($\Delta P_{threshold}$), control system 36 performs 718 a cleaning mode. Further, when the pressure difference ($\Delta P$) is less than, or equal to, the threshold ($P_{threshold}$), control system 36 performs 718 a cleaning mode.

It should be understood that a third pressure, such as pressure $P_{ref2}$, can be used to perform calculations similar to the calculations performed using pressure $P_{ref1}$ and/or can be used in combination with pressure $P_{ref1}$ to perform the calculations described herein. In one embodiment, isolation device 302 is used during the cleaning mode to selectively channel a fluid through flow control system 100 to facilitate removing debris from manifold 106 and apertures 108 in testing chamber 318.

FIG. 11 is a flowchart of a method 800 of operating wind turbine 10 (shown in FIG. 1) that includes flow control system 100 (shown in FIG. 2) having detection system 400 (shown in FIG. 4). Method 800 includes at least some of the steps of method 600 (shown in FIG. 9) and, as such, similar steps are indicated with similar reference numbers. Processor 40 (shown in FIG. 1) within control system 36 is programmed with code segments configured to perform method 800. Alternatively, method 800 is encoded on a computer-readable medium that is readable by control system 36. In such an embodiment, control system 36 and/or processor 40 is configured to read computer-readable medium for performing method 800.

Referring to FIGS. 1, 2, 4, and 10, method 800 includes operating 802 wind turbine 10 in the normal mode, as described above. To actively trigger a different AFC response of flow control system 100, wind turbine 10 is operated 604 in the second mode. Operation 604 in the second mode includes positioning 804 at least one external light sensor 402 on outer surface 126 of blade 22, and positioning 806 at least one internal light sensor 404 within manifold 106 of flow control system 100. More specifically, external light sensor 402 is positioned 804 to detect ambient light ($L_{amb}$), and internal light sensor 404 is positioned 806 to detect light ($L_{manifold}$) entering manifold 106 through at least one aperture 108. Positioning 804 of at least one external light sensor 402 and/or positioning 806 of at least one internal light sensor 404 can occur only once when detection system 400 is installed and/or assembled or can occur repeatedly over the life of wind turbine 10.

Control system 36 acquires 606 operational data of wind turbine 10 during at least the second mode by acquiring 808 first light data from external light sensor 402, and acquiring 810 second light data from internal light sensor 404. The first light data and the second light data each include an amount and/or other measurement of light ($L_{amb}$) and/or light ($L_{manifold}$). To determine 608 an effectiveness of flow control system 100, control system 36 compares 812 the first light data to the second light data. More specifically, control system 36 compares 812 the first light data and the second light data using, for example, Equation 6. In the exemplary embodiment, control system 36 determines 814 a ratio of light ($L_{manifold}$) to light ($L_{amb}$) as the effectiveness of flow control system 100. Alternatively, values, such as absolute values of the light, are compared 812 using other than a ratio. In the exemplary embodiment, when the ratio of ($L_{manifold}$) to light ($L_{amb}$) is less than threshold ($X_{Light1}$), control system 36 performs 716 a cleaning mode. Alternatively, control system 36 performs 716 and action other than a cleaning mode.

FIG. 12 is a flowchart of a method 900 of operating wind turbine 10 (shown in FIG. 1) that includes flow control system 100 (shown in FIG. 2) having detection system 500 (shown in FIGS. 5 and 6). Method 900 includes at least some of the steps of method 600 (shown in FIG. 9) and, as such, similar steps are indicated with similar reference numbers. Processor 40 (shown in FIG. 1) within control system 36 is programmed with code segments configured to perform method 900. Alternatively, method 900 is encoded on a computer-readable medium that is readable by control system 36. In such an embodiment, control system 36 and/or processor 40 is configured to read computer-readable medium for performing method 900.

Referring to FIGS. 1, 2, 5, and 10, method 900 includes operating 902 wind turbine 10 in the normal mode, as described above. To actively trigger the AFC response of flow control system 100, wind turbine 10 is operated 604 in the second mode. Operation 604 in the second mode includes emitting 904 light 506 through glass fiber 502, which extends through at least a portion of flow control system 100. More specifically, control system 36 controls light source 504 to emit 904 light 506 through glass fiber 502. Light ($L_{emitted}$) is emitted 906 from transmitter 518 within flow control system 100 to receiver 520 within flow control system 100. In a particular embodiment, light ($L_{emitted}$) is emitted 906 from transmitter 518 positioned along wall 134 of aperture 108. In the exemplary embodiment, light ($L_{emitted}$) is received 908 by receiver 520. In a particular embodiment, light ($L_{received}$) is received 908 by transmitter 581 after traveling across aperture 108 as reflected light ($L_{reflected}$).

In the exemplary embodiment, control system 36 acquires 606 operational data of wind turbine 10 during at least the second mode by acquiring 910 a measurement of light ($L_{emitted}$) emitted from transmitter 518 toward receiver 520, and by acquiring 912 a measurement of light ($L_{received}$) received by receiver 520. Measurements of light are acquired 910 and/or 912 in any suitable measurement units. To determine 608 an effectiveness of flow control system 100, control system 36 compares 914 the measurement of light ($L_{emitted}$) emitted with the measurement of light ($L_{received}$) received.

More specifically, control system 36 compares 914 the measurement of light ($L_{emitted}$) emitted with the measurement of light ($L_{received}$) received using Equation 7. Control system 36 determines 916 a ratio of light ($L_{received}$) to light ($L_{emitted}$) as the effectiveness of flow control system 100. Alternatively, values are compared 914 using other than a ratio. In the exemplary embodiment, when the ratio of light ($L_{received}$) to light ($L_{emitted}$) is less than threshold ($X_{Light2}$), control system 36 performs 918 a cleaning mode.

Although, the control system described herein is described as identifying the need for cleaning during the second mode, operation during the normal mode may provide sufficient indications to the control system that cleaning may be needed. For example, operation during the normal mode provides an indication of fouling, and the control system begins operating the wind turbine in to the second mode to determine the state and/or extent of fouling as indicated during the normal mode. Moreover upon determining that a cleaning mode did not achieve a level of AFC effectiveness that is substantially equal to a level of AFC effectiveness during a clean state, the control system can modify the normal mode of operation to account for the reduced level of AFC system effectiveness. In the exemplary embodiment, the control uses maps, feed-back loops, and/or feed-forward systems to modify the normal mode based on the AFC system effectiveness.

By determining the effectiveness of an AFC system, control strategies that are not typically related to the AFC system can be modified. For example, control strategies that may have an objective to influence loads can be modified based on the comparisons and/or determinations described herein. To make such loads detectable, loads-influencing controls may have to be influenced or even cancelled in order to make comparable measurements. Further, such controls may be used to aggravate loads that AFC systems are configured to mitigate in order to enhance detectability of such loads.

The above-described systems and methods facilitate correcting and/or preventing fouling of an airfoil and/or an active flow control (AFC) system used with the blade. As such, the embodiments described herein facilitate wide-spread use of AFC in, for example, wind turbine applications. The above-described systems provide an automatic and/or remote controlled method of correcting and/or preventing fouling of an AFC system by using a control system located at least partially within a wind turbine to perform the methods described herein. As such, the AFC system is not required to be only cleaned and/or maintained manually at the wind turbine.

The above-described control system facilitates automatically taking a cleaning and/or preventive action upon determining that the effectiveness of the AFC system has decreased or will decrease. As such, human operator intervention in cleaning an AFC system is facilitated to be reduced. Further, the systems described herein allow for cleaning and/or maintenance of the AFC system and/or wind turbine during optimal operating conditions, such as low power-generating time periods, such that the wind turbine is not required to be taken offline to perform cleaning and/or maintenance. More specifically, the control system described herein automatically determines when ambient, environmental, and/or operating conditions are optimal for performing a corrective and/or preventative action. The control system described herein can further be configured to automatically select an action to perform based on the effectiveness of the AFC system and/or based on actions that have already been performed to increase AFC system effectiveness.

Moreover, the systems and methods described herein are configured to automatically select a cleaning and/or preventative action based on the acquired data relating to the AFC system, available equipment, available consumables, such as detergent and/or water, and/or expected turbine visits. The control system described herein can selectively monitor operations of the wind turbine and/or alter the operation of wind turbine to acquire data relevant to determining the effectiveness of the AFC system. Upon acquiring data, the embodiments described herein are configured to continue to acquire data, transmit a smart warning message ranging from a mild message to an alarm message to an operator of a wind turbine, change a mode of operating the wind turbine to prevent and/or correct fouling, and/or shut down the wind turbine, if a severe problem persists.

A technical effect of the systems and method described herein includes at least one of: (a) operating the wind turbine in a normal mode; (b) operating the wind turbine in a second mode that is different than the normal mode; (c) acquiring operational data of the wind turbine during at least the second mode; (d) determining an effectiveness of the flow control system of the wind turbine using the acquired operational data; and (e) performing an action based on the effectiveness of the flow control system.

Exemplary embodiments of methods and systems of operating a wind turbine are described above in detail. The methods and systems are not limited to the specific embodiments described herein, but rather, components of the systems and/or steps of the methods may be utilized independently and separately from other components and/or steps described herein. For example, the methods may also be used in combination with other active flow control systems, and are not limited to practice with only the wind turbine systems as described herein. Rather, the exemplary embodiment can be implemented and utilized in connection with many other active flow control applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a wind turbine that includes an active flow control system having an air distribution system at least partially defined within at least one blade of the wind turbine, the active flow control system including a detection device including an isolation device, said method comprising:
   operating the wind turbine in a normal mode using the air distribution system;
   operating the wind turbine in a cleaning mode that is different than the normal mode by:
      positioning the isolation device within a manifold of the air distribution system;
      activating the isolation device to partition the manifold into at least two chambers; and, channeling a fluid flow into at least one of the two chambers within the manifold;
acquiring operational data of the wind turbine during at least the cleaning mode by:
determining a first pressure within a first chamber of the two chambers;
determining a second pressure within a second chamber of the two chambers; and,
comparing the first pressure with the second pressure;
determining a state of fouling of the air distribution system using the acquired operational data; and,
performing an action based on the state of fouling of the air distribution system.

2. A method in accordance with claim 1, wherein operating the wind turbine in the cleaning mode that is different than the normal mode further comprises varying a level of active flow control response of the active flow control system over a period of time to acquire the operational data used to determine the state of fouling.

3. A method in accordance with claim 1, wherein acquiring operational data of the wind turbine during at least the cleaning mode comprises acquiring at least one of a power output of the wind turbine, a load in a component of the wind turbine, a blade section load measurement of the blade, a blade root bending moment of the blade, and data relating to an internal quantity of the blade.

4. A method in accordance with claim 1, wherein performing an action based on the state of fouling of the air distribution system comprises performing at least one of transmitting a smart warning message to an operator of the wind turbine, transmitting a smart alarm message to the operator of the wind turbine, changing a mode of operation of the wind turbine to the cleaning mode, and shutting down the wind turbine.

5. A method of operating a wind turbine that includes an active flow control system having an air distribution system at least partially defined within at least one blade of the wind turbine, said method comprising:
operating the wind turbine in a normal mode using the air distribution system;
operating the wind turbine in a cleaning mode that is different than the normal mode by:
positioning at least one external light sensor with respect to a blade of the wind turbine; and,
positioning at least one internal light sensor within a manifold of the air distribution system;
acquiring operational data of the wind turbine during at least the cleaning mode;
determining a state of fouling of the air distribution system using the acquired operational data; and,
performing an action based on the state of fouling of the air distribution system.

6. A method in accordance with claim 5, wherein acquiring operational data of the wind turbine during at least the cleaning mode comprises:
acquiring first light data from the external light sensor;
acquiring second light data from the internal light sensor; and,
comparing the first light data with the second light data to determine the state of fouling of the air distribution system.

7. A method in accordance with claim 5, wherein operating the wind turbine in the cleaning mode that is different than the normal mode further comprises varying a level of active flow control response of the active flow control system over a period of time to acquire the operational data used to determine the state of fouling.

8. A method in accordance with claim 5, wherein acquiring operational data of the wind turbine during at least the cleaning mode comprises acquiring at least one of a power output of the wind turbine, a load in a component of the wind turbine, a blade section load measurement of the blade, a blade root bending moment of the blade, and data relating to an internal quantity of the blade.

9. A method in accordance with claim 5, wherein performing an action based on the state of fouling of the air distribution system comprises performing at least one of transmitting a smart warning message to an operator of the wind turbine, transmitting a smart alarm message to the operator of the wind turbine, changing a mode of operation of the wind turbine to the cleaning mode, and shutting down the wind turbine.

10. An active flow control system for use with a wind turbine, said active flow control system comprising:
an air distribution system at least partially defined within at least one blade of the wind turbine, said air distribution system comprising a manifold and at least one aperture defined through an outer surface of the blade at the manifold;
a detection system comprising an isolation device positioned within said manifold of said air distribution system; and,
a control system in operational control communication with said air distribution system, said control system configured to:
operate the wind turbine in a normal mode using said air distribution system;
operate the wind turbine in a cleaning mode that is different than the normal mode by activating said isolation device to partition said manifold into at least two chambers and channeling a fluid flow into at least one of said two chambers within said manifold;
acquire operational data of said wind turbine during at least said cleaning mode by determining a first pressure within a first chamber of said two chambers and determining a second pressure within a second chamber of said two chambers;
determine a state of fouling of said air distribution system using the acquired operational data by comparing the first pressure with the second pressure; and,
perform an action based on the state of fouling of said air distribution system.

11. An active flow control system in accordance with claim 10, wherein said control system is configured to acquire at least one of a power output of the wind turbine, a load in the blade, a blade section load measurement of the blade, a blade root bending moment of the blade, and data relating to an internal quantity of the blade, wherein the internal quantity comprises at least one of a power required to discharge fluid from said air distribution system, a pressure in said manifold of said air distribution system, and a flow rate in said manifold with respect to time.

12. An active flow control system in accordance with claim 10, wherein said control system is configured to detect the state of fouling, detect an opportunity to correct the fouling, and operate the wind turbine in said cleaning mode to facilitate removing debris from said air distribution system.

13. An active flow control system in accordance with claim 10, wherein said control system is configured to vary a level of active flow control response over a period of time depending on at least one of an ambient condition, an environmental condition, and an operational parameter to acquire the operational data.

14. An active flow control system for use with a wind turbine, said active flow control system comprising:
- an air distribution system at least partially defined within at least one blade of the wind turbine, said air distribution system comprising a manifold and at least one aperture defined through an outer surface of the blade at the manifold;
- a detection system comprising at least one external light sensor positioned on the outer surface of the blade and at least one internal light sensor positioned within said manifold of said air distribution system; and,
- a control system in operational control communication with said air distribution system, said control system configured to:
  - operate the wind turbine in a normal mode using said air distribution system;
  - operate the wind turbine in a cleaning mode that is different than the normal mode;
  - acquire operational data of said wind turbine during at least said cleaning mode by acquiring first light data from said external light sensor and acquiring second light data from said internal light sensor;
  - determine a state of fouling of said air distribution system using the acquired operational data by comparing the first light data with the second light data; and,
  - perform an action based on the state of fouling of said air distribution system.

15. An active flow control system in accordance with claim 14, wherein said control system is configured to acquire at least one of a power output of the wind turbine, a load in the blade, a blade section load measurement of the blade, a blade root bending moment of the blade, and data relating to an internal quantity of the blade, wherein the internal quantity comprises at least one of a power required to discharge fluid from said air distribution system, a pressure in said manifold of said air distribution system, and a flow rate in said manifold with respect to time.

16. An active flow control system in accordance with claim 14, wherein said control system is configured to detect the state of fouling, detect an opportunity to correct the fouling, and operate the wind turbine in said cleaning mode to facilitate removing debris from said air distribution system.

17. An active flow control system in accordance with claim 14, wherein said control system is configured to vary a level of active flow control response over a period of time depending on at least one of an ambient condition, an environmental condition, and an operational parameter to acquire the operational data.

18. A wind turbine, comprising:
- at least one blade;
- an active flow control system comprising an air distribution system at least partially defined within said blade, said air distribution system comprising a manifold and at least one aperture defined through an outer surface of said blade at said manifold;
- a detection system comprising at least one external light sensor positioned on the outer surface of the blade and at least one internal light sensor positioned within said manifold of said air distribution system; and,
- a control system in operational control communication with said active flow control system, said control system configured to:
  - operate said wind turbine in a normal mode using said air distribution system;
  - operate said wind turbine in a cleaning mode that is different than the normal mode;
  - acquire operational data of said wind turbine during at least the cleaning mode by acquiring first light data from said external light sensor and acquiring second light data from said internal light sensor;
  - determine a state of fouling of said air distribution system using the acquired operational data by comparing the first light data with the second light data; and,
  - perform an action based on the state of fouling of said air distribution system.

19. A wind turbine in accordance with claim 18, wherein said control system is further configured to automatically perform at least one of transmitting a smart warning message to an operator of said wind turbine, transmitting a smart alarm message to the operator of said wind turbine, changing a mode of operation of said wind turbine to the cleaning mode, and shutting down said wind turbine.

* * * * *